(12) United States Patent
Nakamura et al.

(10) Patent No.: US 10,533,653 B2
(45) Date of Patent: Jan. 14, 2020

(54) MOTOR WITH SPEED REDUCTION MECHANISM

(71) Applicant: Mitsuba Corporation, Gunma (JP)

(72) Inventors: Osamu Nakamura, Gunma (JP); Atsushi Kawasaki, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 304 days.

(21) Appl. No.: 15/525,118

(22) PCT Filed: Nov. 9, 2015

(86) PCT No.: PCT/JP2015/081445
§ 371 (c)(1),
(2) Date: May 8, 2017

(87) PCT Pub. No.: WO2016/076250
PCT Pub. Date: May 19, 2016

(65) Prior Publication Data
US 2018/0259059 A1     Sep. 13, 2018

(30) Foreign Application Priority Data
Nov. 10, 2014   (JP) .................................. 2014-228188

(51) Int. Cl.
*F16H 57/039*     (2012.01)
*F16H 1/16*       (2006.01)
*F16H 57/04*      (2010.01)

(52) U.S. Cl.
CPC ........... *F16H 57/0421* (2013.01); *F16H 1/16* (2013.01); *F16H 57/039* (2013.01); *F16H 57/0498* (2013.01)

(58) Field of Classification Search
CPC ............... F16H 57/039; F16H 57/0498; F16H 57/0464; F16H 57/0424; F16H 57/0421; F16H 1/16; H02K 7/1166
See application file for complete search history.

(56) References Cited

FOREIGN PATENT DOCUMENTS

DE   102005012623 A1 * 9/2006 ......... F16H 57/0498
DE   102005012623 A1   9/2006
(Continued)

OTHER PUBLICATIONS

International Search Report for PCT Serial No. PCT/JP2015/081445 dated Jan. 26, 2016.
(Continued)

*Primary Examiner* — Luis A Gonzalez
(74) *Attorney, Agent, or Firm* — McCormick, Paulding & Huber PLLC

(57) ABSTRACT

A motor with speed reduction mechanism is provided with an anti-scattering cover 80 for grease, which holds grease applied to a mating part MT where a worm 36*b* and a worm wheel 40 are in engagement with each other, the anti-scattering cover 80 for grease is provided and closer to an opening 32*c* than the worm wheel 40 along an axial direction of the worm wheel 40. The anti-scattering cover 80 for grease has: a first wall 81 extending from the opening 32*c* toward a bottom 32*a* and formed between the worm 36*b* and a side wall 32*b* of a speed reduction mechanism housing unit 32; and a second wall 82 extending in a direction intersecting with the first wall 81 and covering the mating part MT from the same side as the opening 32*c* along the axial direction of the worm wheel 40. The first wall 81 and the second wall 82 of the anti-scattering cover 80 for grease hold grease attached to the worm 36*b*, thereby preventing exhaus- (Continued)

tion of grease applied to the mating part MT where worm 36*b* and the worm wheel 40 are in engagement with each other.

12 Claims, 22 Drawing Sheets

(56) References Cited

FOREIGN PATENT DOCUMENTS

| | | |
|---|---|---|
| JP | 2002-147575 A | 5/2002 |
| JP | 2005-117868 A | 4/2005 |
| JP | 2007-274768 A | 10/2007 |
| JP | 2008-22681 A | 1/2008 |
| JP | 2009-130980 A | 6/2009 |
| JP | 2009248724 A | 10/2009 |
| JP | 2010-246261 A | 10/2010 |
| JP | 2011-93485 A | 5/2011 |
| JP | 2011-234453 A | 11/2011 |
| JP | 2014-9744 A | 1/2014 |
| WO | 2014157399 A1 | 10/2014 |

OTHER PUBLICATIONS

Supplementary European Search Report for Serial No. EP 15 85 8177 dated May 2, 2018.

\* cited by examiner

FIG. 6
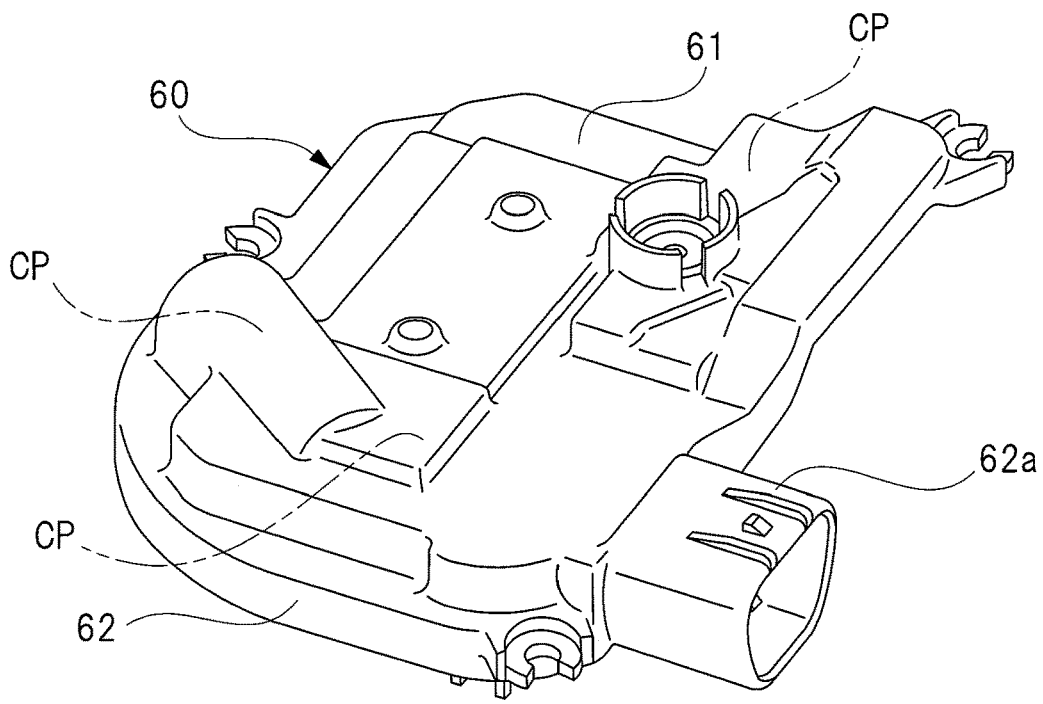
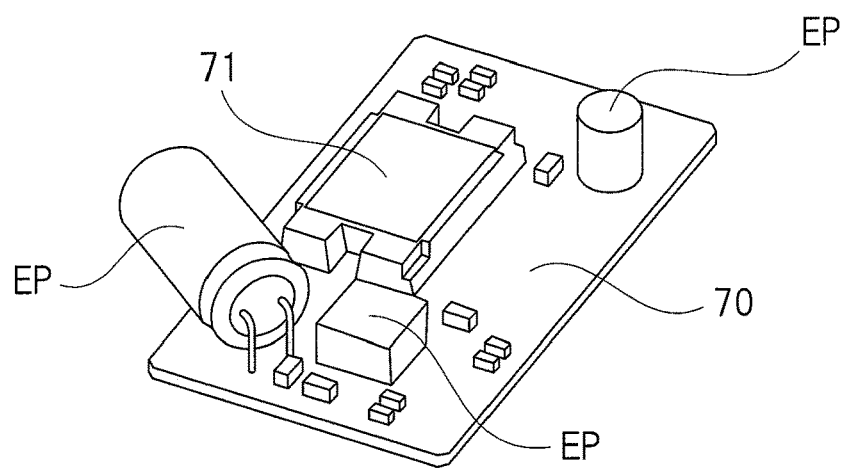
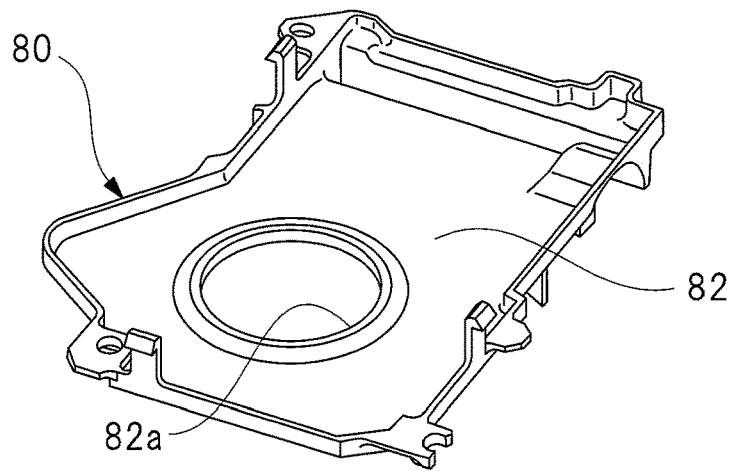

FIG. 10
(a)
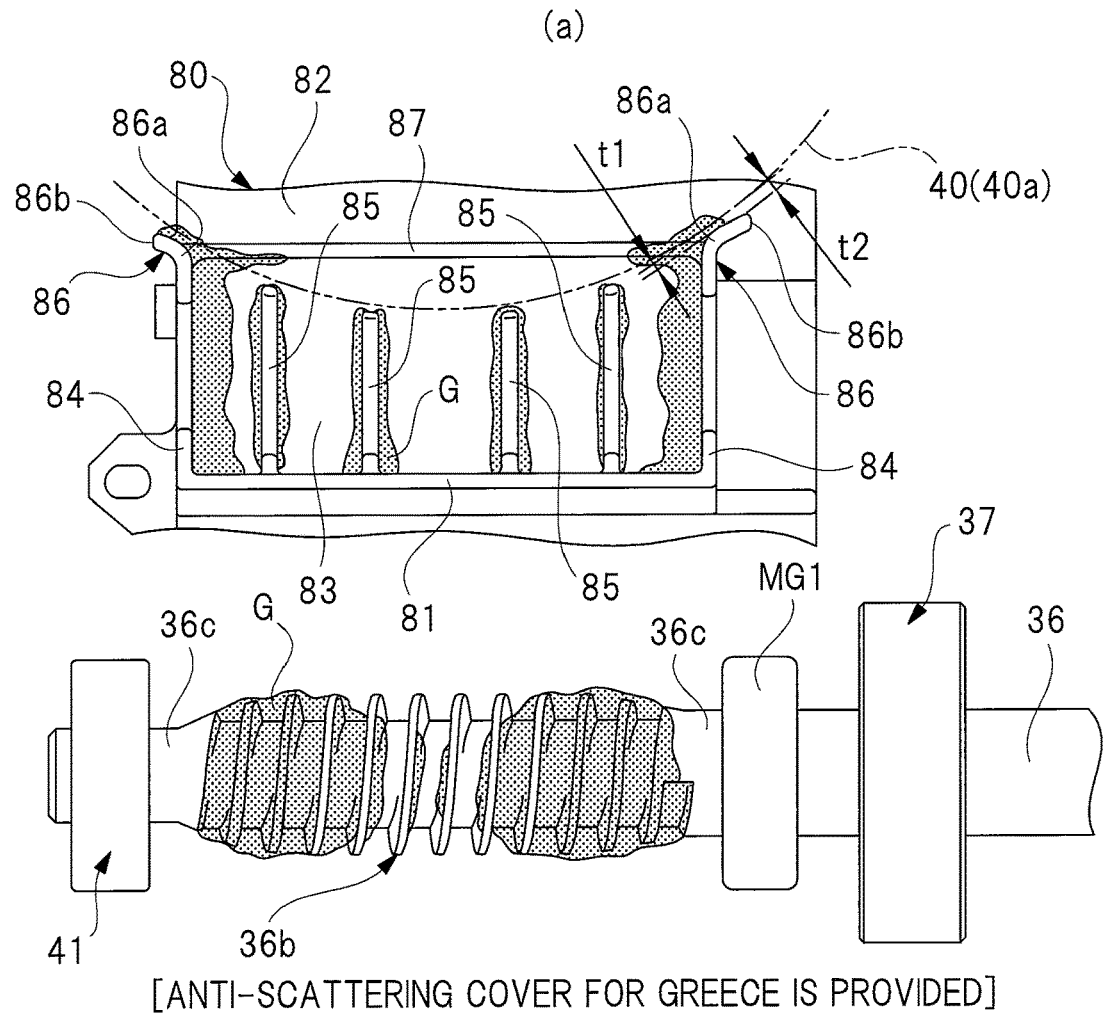
[ANTI-SCATTERING COVER FOR GREECE IS PROVIDED]
(b)
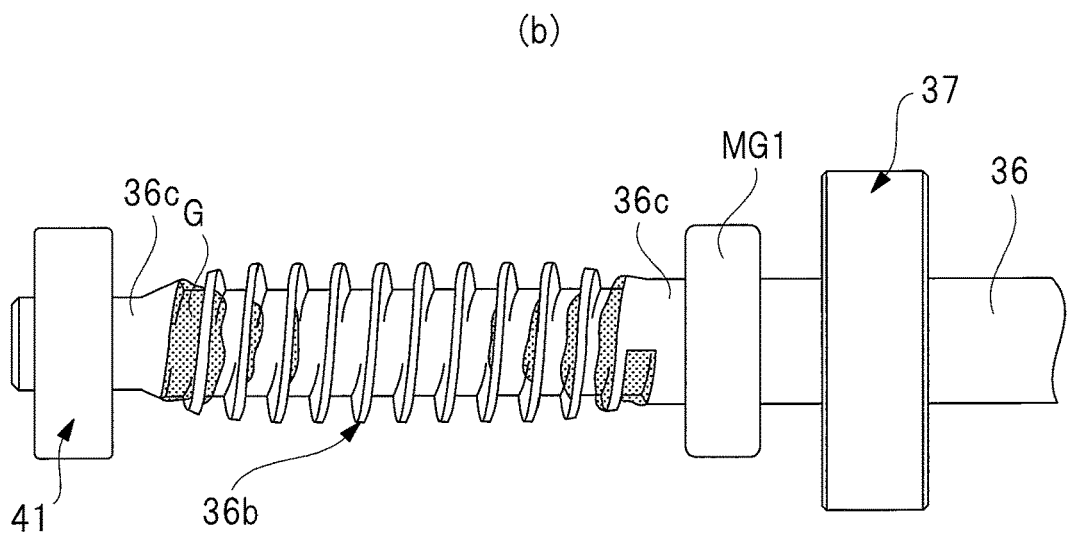
[ANTI-SCATTERING COVER FOR GREECE IS NOT PROVIDED]

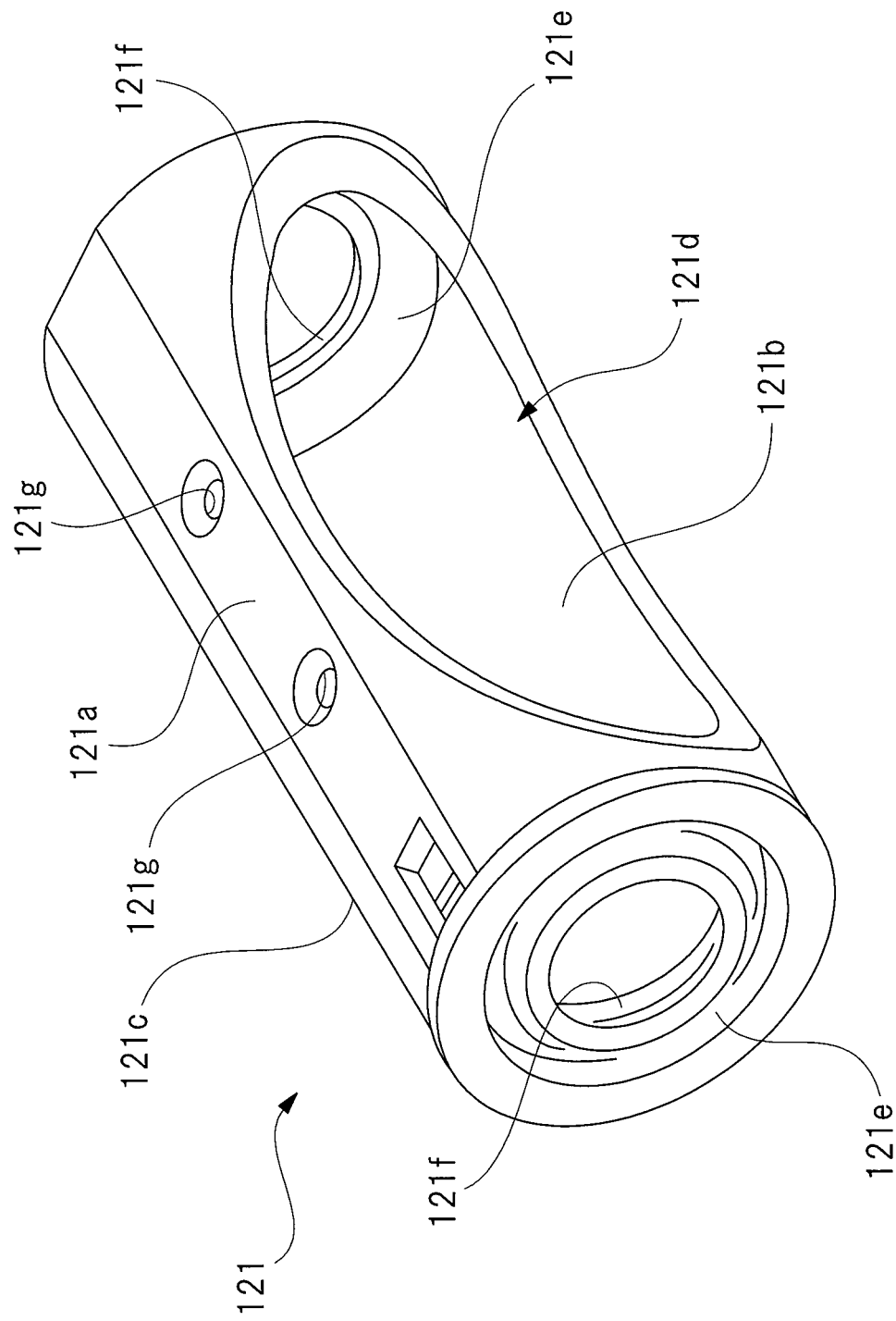

MOTOR WITH SPEED REDUCTION MECHANISM

CROSS-REFERENCE TO RELATED APPLICATIONS

This application is a National Stage application of International Patent Application No. PCT/JP2015/081445, filed on Nov. 9, 2015, which claims priority to Japanese Patent Application No. 2014-228188, filed on Nov. 10, 2014, each of which is hereby incorporated by reference in its entirety.

TECHNICAL FIELD

The present invention relates to a motor with speed reduction mechanism, provided with a worm and a worm wheel.

BACKGROUND ART

Conventionally, a wiper apparatus is mounted on a vehicle such as automotive vehicle, and configured to wipe off foreign objects such as rainwater and dust on a windshield. The wiper apparatus is provided with: wiper members provided on the windshield; and a wiper motor configured to swing the wiper members. By switching on a wiper switch provided in an interior of the vehicle, the wiper motor is rotated, thereby swinging the wiper members on the windshield. Since the wiper motor is installed in a small space of this vehicle, a motor with speed reduction mechanism is employed to secure a reduced size and a large output power.

Such a motor with speed reduction mechanism is provided by, for example, a technique described in Japanese Unexamined Patent Application Publication No. 2002-147575 (FIGS. 2 and 5). The motor with speed reduction mechanism described in Japanese Unexamined Patent Application Publication No. 2002-147575 (FIGS. 2 and 5) has a worm to be rotated by the motor, and a worm wheel engaged with the worm. The worm and the worm wheel make up the speed reduction mechanism. This worm speed reducer can be adopted in many cases as in-vehicle motor with speed reduction mechanism. The motor rotates the worm with a small diameter at high speed, which in turn rotates the worm wheel with a large diameter at low speed. The worm wheel thus outputs a high torque.

In order to allow the speed reduction mechanism to operate smoothly for a long period, a predetermined amount of grease (highly viscous lubricating oil) is applied to a mating part where the worm and the worm wheel are in engagement with each other. Although grease is highly viscous, grease is movable to both sides of the worm in its longitudinal direction to end up in gathering in a one-sided location, or scattered to surroundings of the worm by rotation of the worm. This leads to exhaustion of grease on the mating part. In order to prevent one-sided displacement of greases, according to the technique described in Japanese Unexamined Patent Application Publication No. 2002-147575 (FIGS. 2 and 5), a guide member which guides grease toward the center of the worm in its axial direction is disposed on both sides of the worm in its axial direction. On the other hand, in order to prevent grease from being scattered by rotation of the worm, a housing is brought closer to the worm.

SUMMARY

The motor with speed reduction mechanism described in Japanese Unexamined Patent Application Publication No. 2002-147575 (FIGS. 2 and 5), however, needs to have two small components disposed on respective sides of the worm in its axial direction, and encounters a problem that the number of components increases, and that an assembly process becomes complicated. In addition, by reducing a clearance between the housing and the worm, it is necessary to, after the worm is placed in the housing, fit a ball bearing to the front end portion of the worm, and fit a lid to the housing for preventing the exposure of the ball bearing. This case leads to an increase in the number of components and complication of the assembling process.

An object of the present invention is to provide a motor with speed reduction mechanism, which prevents an increase in the number of components thereof to simplify an assembling process, and which suppresses exhaustion of grease.

According to one aspect of the present invention, there is provided a motor with speed reduction mechanism, which has a worm and a worm wheel, comprising: a housing in which the worm and the worm wheel is housed and rotatable, the housing having a bottom and an opening, which are opposite to each other in an axial direction of the worm wheel; and a grease holding member disposed along the axial direction of the worm wheel to the opening than the worm wheel, the grease holding member holding grease applied to a mating part where the worm and worm wheel are in engagement with each other, wherein the grease holding member includes: a first wall extending from the opening toward the bottom, the first wall being formed between the worm and a side wall of the housing; and a second wall extending in a direction intersecting with the first wall, the second wall covering the mating part from the same side as the opening along the axial direction of the worm wheel.

According to another aspect of the present invention, in the motor with speed reduction mechanism, the grease holding member includes a pair of third walls extending from the opening toward the bottom at both sides of the worm in an axial direction thereof, the third walls each having a cutout which prevents the third wall from coming in contact with the worm.

According to another aspect of the present invention, in the motor with speed reduction mechanism, a first projection is formed between the pair of third walls of the grease holding member, the first projection projecting toward the worm in a direction intersecting with the axial direction of the worm.

According to another aspect of the present invention, in the motor with speed reduction mechanism, a smoothing wall is formed on the same side portion of the third wall as the worm wheel, and configured to smooth out irregularities of grease on teeth of the worm wheel.

According to another aspect of the present invention, in the motor with speed reduction mechanism, in a view seen in the axial direction of the worm wheel, the smoothing wall is of a shape having a pair of end portions and a bent portion and sandwiching by the end portions, and the bent portion is disposed closer to the worm wheel than the end portions.

According to another aspect of the present invention, in the motor with speed reduction mechanism, a second projection is formed on an opposite side of the grease holding member to the first wall with respect to the worm, the second projection projecting toward the worm wheel in a direction intersecting with the axial direction of the worm.

According to another aspect of the present invention, in the motor with speed reduction mechanism, a third projection is formed on an opposite side of the housing to the first projection with respect to the worm, the third projection projecting toward the worm in a direction intersecting with an axial direction of the worm.

According to another aspect of the present invention, in the motor with speed reduction mechanism, the worm wheel and the grease holding member are brought and placed in the housing in respective directions the same as each other through the opening.

According to another aspect of the present invention, in the motor with speed reduction mechanism, a grease holding wall is formed on the same side of the worm wheel as the bottom along the axial direction of the worm wheel, the grease holding wall holding grease likely to move from the mating part toward the bottom.

According to another aspect of the present invention, in the motor with speed reduction mechanism, the grease holding member has a fourth wall extending in a direction intersecting with the first wall, and covering the mating part from a side closer to the bottom along an axial direction of the worm wheel.

According to another aspect of the present invention, in the motor with speed reduction mechanism, the grease holding member includes a first opening/closing element and a second opening/closing element, which open and close to encircle the worm, and the first opening/closing element is provided with the second wall, and the second opening/closing element is provided with the fourth wall.

According to the present invention, a grease holding member which holds grease applied to the mating part where the worm and the worm wheel are in engagement with each other is disposed in a location closer to the opening than the worm wheel along its axial direction. The grease holding member has a first wall extending from the opening toward the bottom, the first wall being formed between the worm and the side wall of the housing, and a second wall extending in a direction intersecting with the first wall, the second wall covering the mating part from the side closer to the opening along the axial direction of the worm wheel. The first and second walls of the grease holding member thus hold grease attached to the worm, thereby suppressing exhaustion of grease applied to the mating part where the worm and the worm wheel are in engagement with each other.

The first wall extends from the opening toward the bottom. This allows the grease holding member to be brought and placed in the housing in the same direction in which the worm wheel is brought and placed in the housing. As a result, compared to conventional cases, an increase in the number of components is prevented as the assembling process is simplified significantly.

The crease holding member is further provided with a pair of third walls extending at both sides of the worm in its axial direction, from the opening toward the bottom, each of the third walls having a cutout which prevents the third wall from coming in contact with the worm. The third walls suppress displacement of grease toward both sides of the worm in the axial direction by rotation of the worm.

BRIEF DESCRIPTION OF THE DRAWINGS

FIG. 6 is an exploded perspective view of the details of the gear cover and components attached thereto;

FIGS. 10A and 10B are explanatory views comparing: a case in which the anti-scattering cover for grease is provided, with a case in which the anti-scattering cover for grease is not provided;

FIG. 22 is a perspective view of the grease holding member of FIG. 20 in its isolated form.

DETAILED DESCRIPTION

Hereinafter, the first embodiment of the present invention will be described with reference to the drawings.

Figure 1:
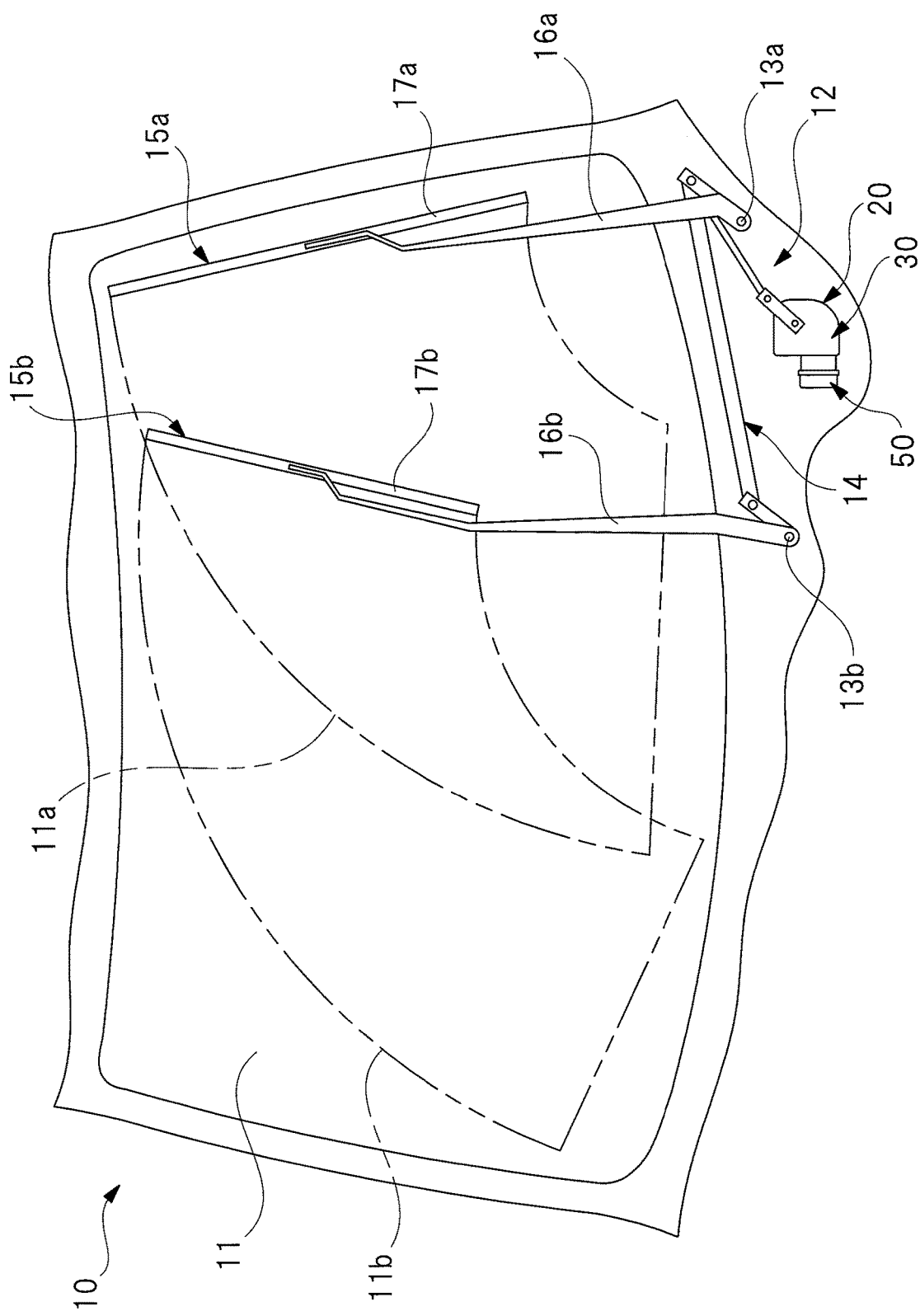
FIG. 1 is a diagram of a wiper apparatus incorporated in a vehicle, the wiper apparatus having a wiper motor.
Figure 2:
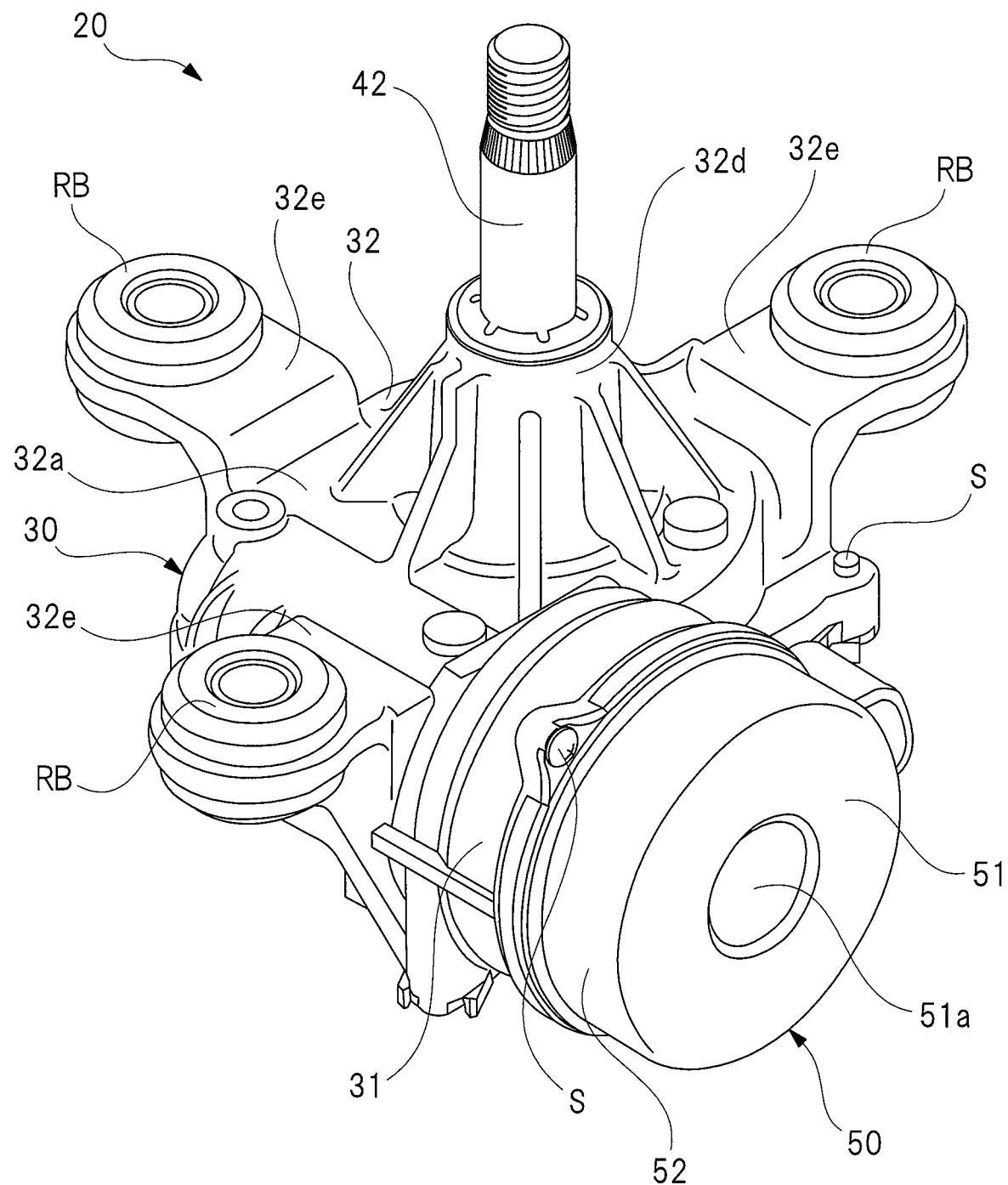
FIG. 2 is a perspective view of the wiper motor of FIG. 1, seen from the same side as the motor housing unit.
Figure 3:
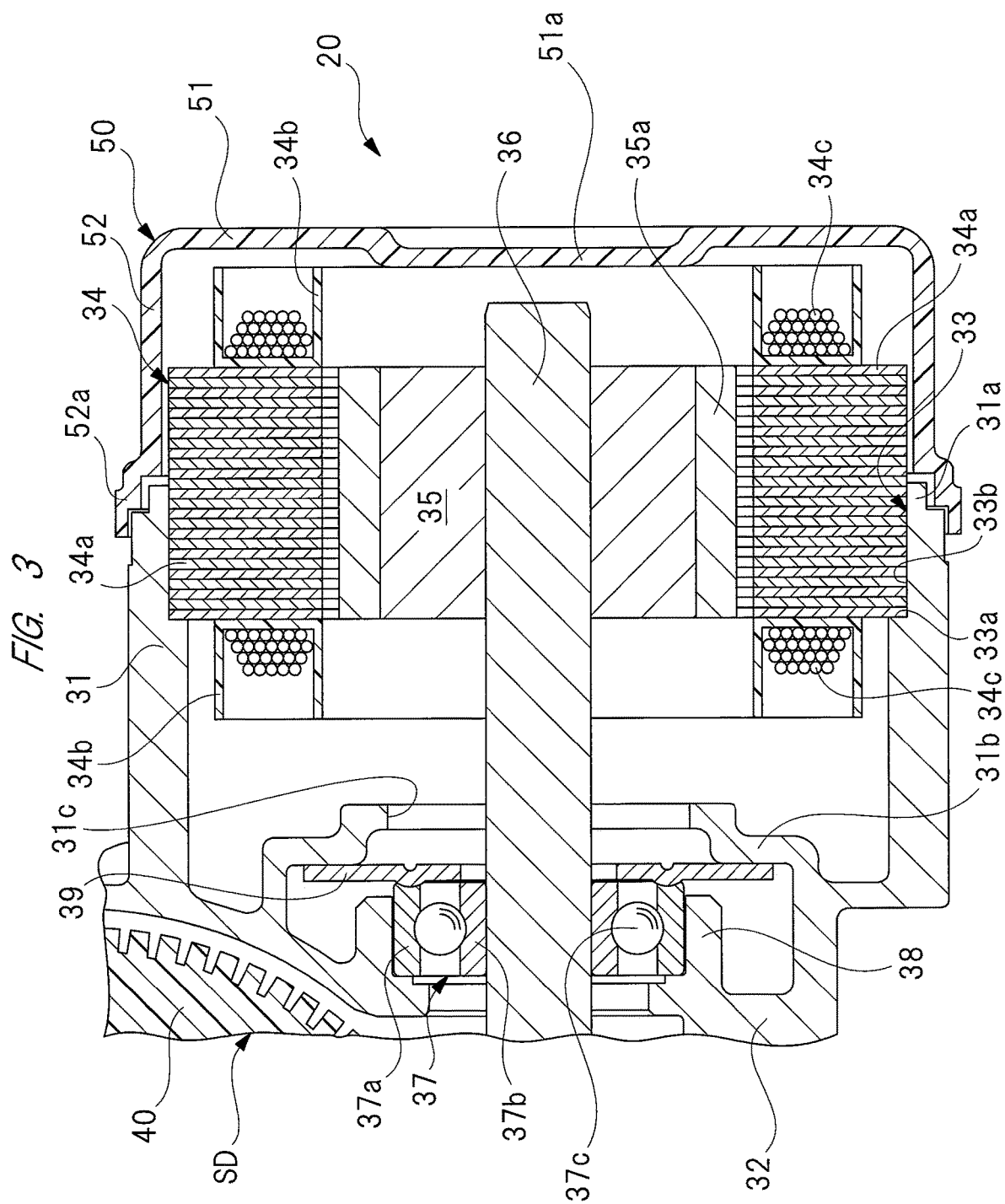
FIG. 3 is an enlarged sectional view of the inside of the motor housing unit of FIG. 2.
Figure 4:
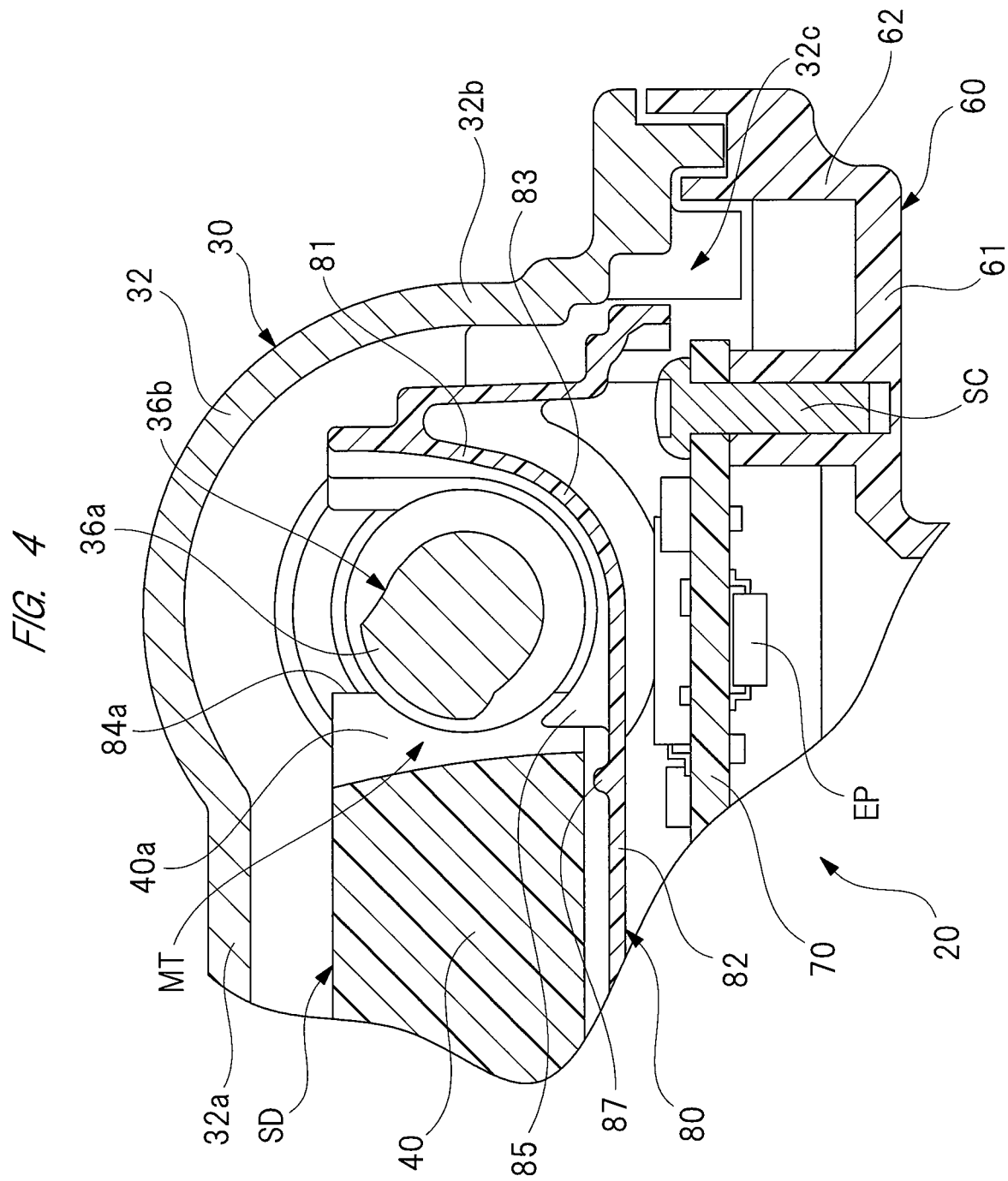
FIG. 4 is a partially enlarged sectional view of a worm along a direction intersecting with an axial direction of the worm.
Figure 5:
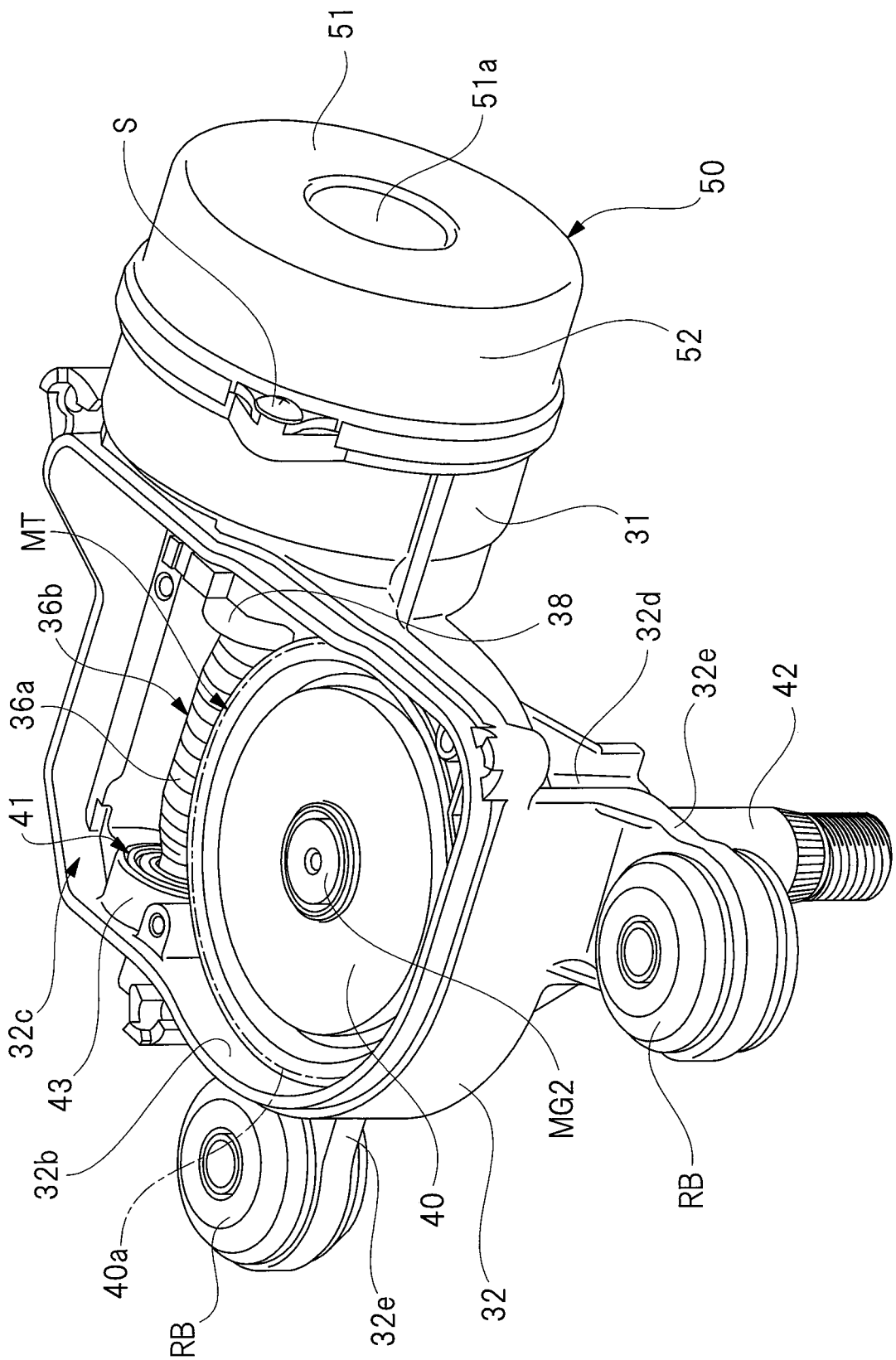
FIG. 5 is a perspective view showing details of a speed reduction mechanism provided in a housing with a gear cover detached.
Figure 7:
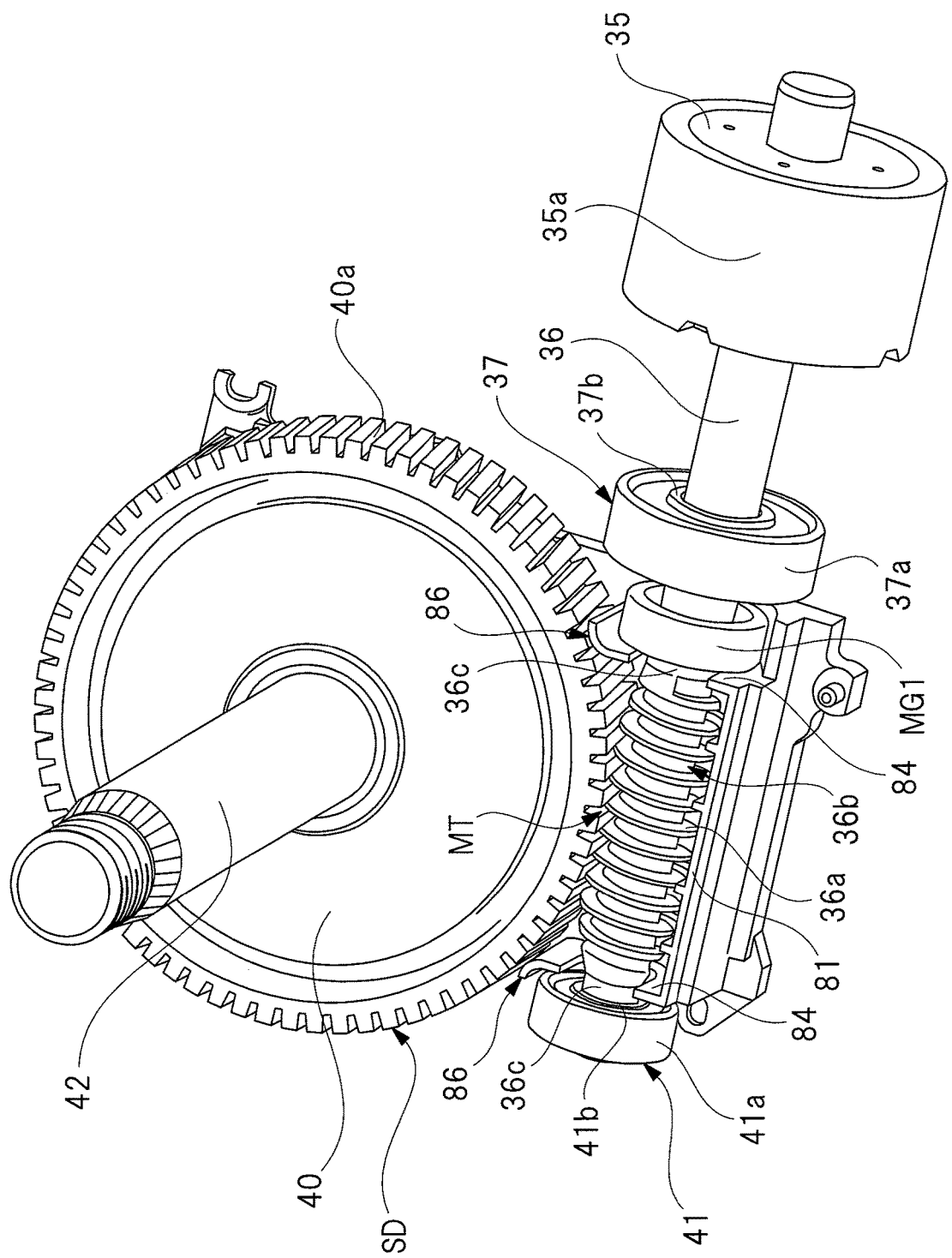
FIG. 7 is a perspective view of the speed reduction mechanism and an anti-scattering cover for grease, seen from the bottom side of the housing.
Figure 8:
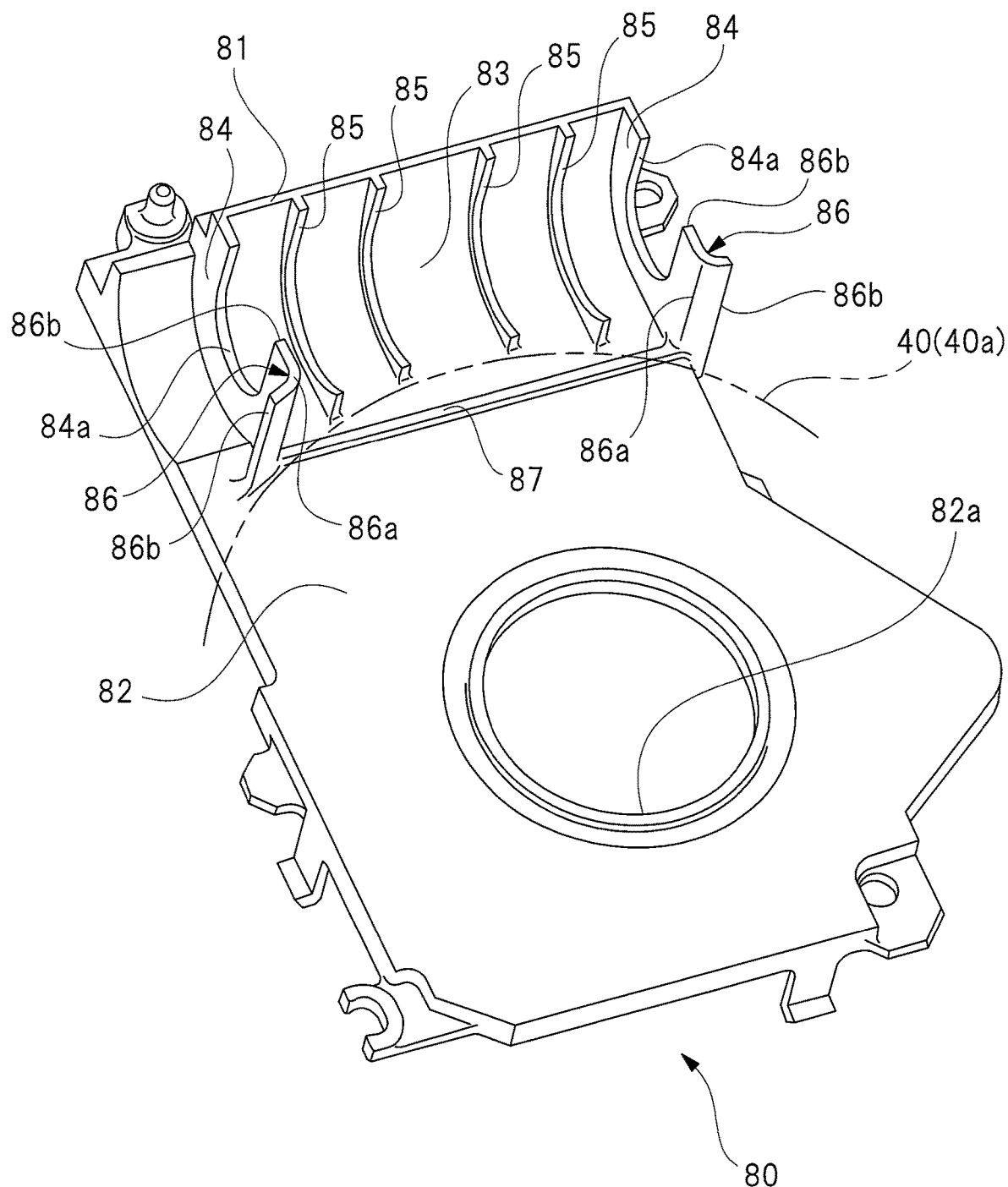
FIG. 8 is a perspective view of the anti-scattering cover for grease, seen from the bottom side of the housing.
Figure 9:
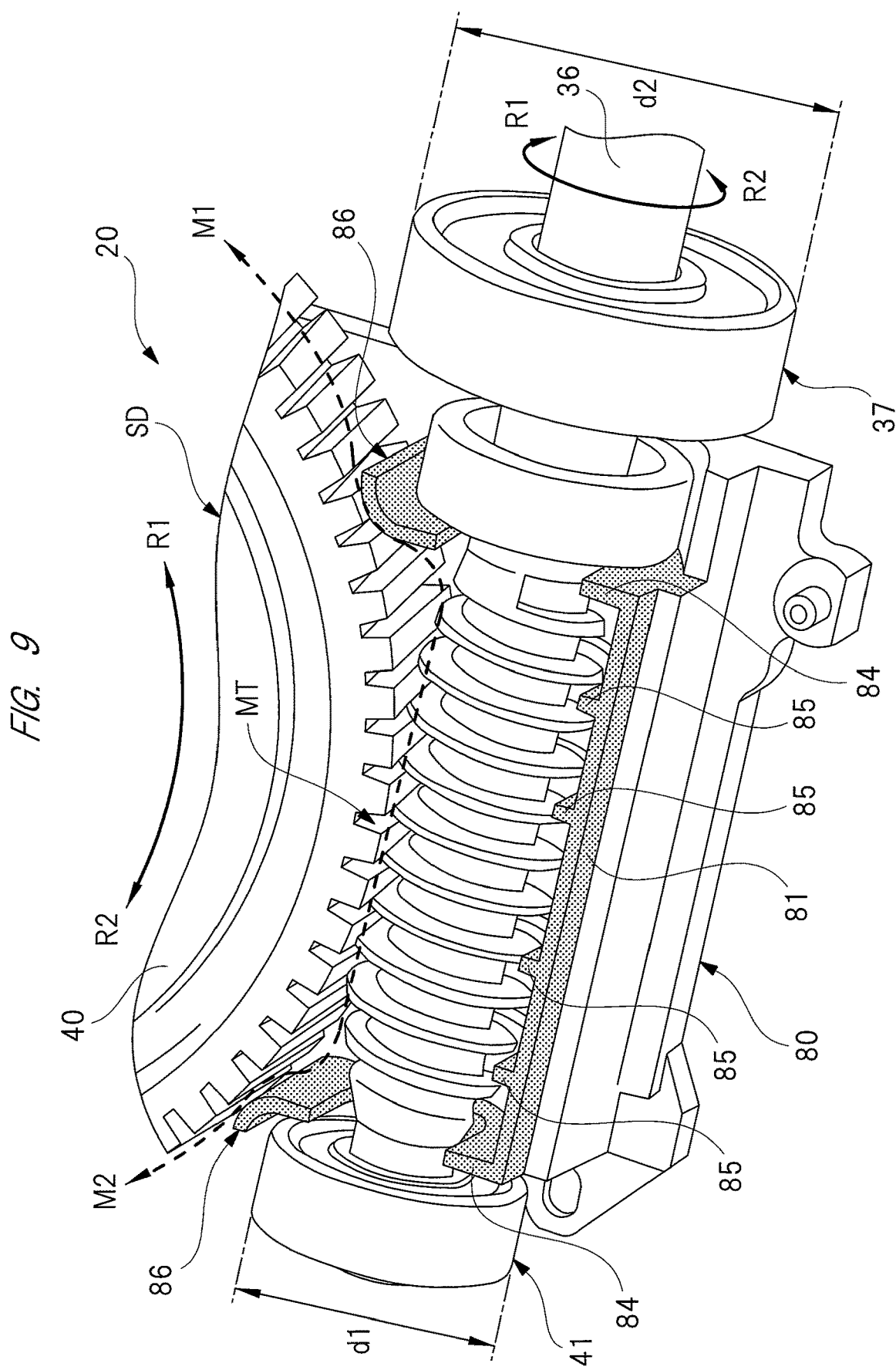
FIG. 9 is an explanatory view explaining a state of displacement of grease on a mating part.

FIG. 1 is a diagram of a wiper apparatus incorporated in a vehicle, the wiper apparatus having a wiper motor; FIG. 2 is a perspective view of the wiper motor of FIG. 1, seen from the same side as the motor housing unit; FIG. 3 is an enlarged sectional view of the inside of the motor housing unit of FIG. 2; FIG. 4 is a partially enlarged sectional view of a worm along a direction intersecting with an axial direction of the worm; FIG. 5 is a perspective view showing details of a speed reduction mechanism provided in a housing with a gear cover detached; FIG. 6 is an exploded perspective view of the details of the gear cover and components attached thereto; FIG. 7 is a perspective view of the speed reduction mechanism and an anti-scattering cover for grease, seen from the bottom side of the housing; FIG. 8 is a perspective view of the anti-scattering cover for grease, seen from the bottom side of the housing; FIG. 9 is an explanatory view explaining a state of displacement of grease on a mating part; and FIGS. 10A and 10B are explanatory views comparing: a case in which the anti-scattering cover for grease is provided, with a case in which the anti-scattering cover for grease is not provided.

As shown in FIG. 1, a vehicle 10 such as automotive vehicle has a front windshield 11. A wiper apparatus 12 is disposed on the tip end portion of the front windshield 11 of the vehicle 10. By turning on a wiper switch (not shown) disposed in the vehicle interior, the wiper apparatus 12 is driven, and configured to wipe off foreign objects such as rainwater and dust (not shown) away from the front windshield 11.

The wiper apparatus 12 includes: a wiper motor 20; a power transmitting mechanism 14 which transmits an oscillation of the wiper motor 20 to pivots 13a and 13b; and a pair of wipers 15a and 15b respectively having: base ends fixed to the pivots 13a and 13b, and tip end portions to be reciprocated on the front windshield 11 by the oscillation of the pivots 13a and 13b.

The wiper 15a and the wiper 15b are respectively provided to the driver's seat side and the passenger's seat side. The wiper 15a is composed of a wiper arm 16a and a wiper blade 17a attached to the wiper arm 16a, and the wiper 15b is composed of a wiper arm 16b and a wiper blade 17b attached to the wiper arm 16b.

Additionally, when the wiper motor 20 is driven and rotated, the oscillation is transmitted to the pivots 13a and 13b through the power transmitting mechanism 14. This swings the pivots 13a and 13b. Thus, the driving force of the wiper motor 20 is transmitted to the wipers 15a and 15b, which causes the wiper blades 17a and 17b to wipe foreign objects away from predetermined ranges 11a and 11b of the front windshield 11.

As shown in FIGS. 2 to 5, the wiper motor (motor with speed reduction mechanism) 20 includes a housing 30 made of aluminum, a motor cover 50 made of plastic, and a gear cover 60 made of plastic. The housing 30, the motor cover 50, and the gear cover 60 are connected to each other with a plurality of fastening screws "S" (two of them are shown in FIG. 2). Between the housing 30 and the motor cover 50 and between the housing 30 and the gear cover 60, a sealing material (not shown), such as O-ring, is provided, and the sealing material prevents rainwater, etc., from infiltrating into the wiper motor 20.

The housing 30 is formed into a predetermined shape by, for example, molding melted aluminum material. The housing 30 has a motor housing unit 31 and a speed reduction mechanism housing unit 32. As shown in FIGS. 2, 3, and 5, the motor housing unit 31 is of a bottomed cylindrical shape. One end of the motor housing unit 31 in its axial direction (right-hand side in FIG. 3) is formed into an opening portion, where a stepped and annular cover fitting portion 31a is formed, on which a fitting portion 52a of the motor cover 50 is fitted. On the other end of the motor housing unit 31 in its axial direction (left-hand side in FIG. 3), an annular bottom 31b is formed. At the center of the annular bottom 31b, a though-hole 31c is formed, through which a rotating shaft 36 is put rotatably.

On the inside of the motor housing unit 31, an annular stepped portion 33 is formed. This stepped portion 33 is composed of an annular bottom wall 33a and a cylindrical side wall 33b. Inside the stepped portion 33, a stator core (stator) 34 is placed. The stator core 34 is formed into a substantially cylindrical shape by stacking and bonding together a plurality of steel sheets 34a made of magnetic material. Roughly half of the outer periphery of stator core 34 which is closer to the speed reduction mechanism housing unit 32 along the axial direction is press fitted to the side wall 33b making up the inner periphery of the motor housing unit 31. This fixes the stator core 34 and the motor housing unit 31 strongly together.

On both sides of the stator core 34 in its axial direction, resin coil bobbins 34b serving as insulators are formed, respectively. Each coil bobbin 34b is wound with coils 34c of three phases, i.e., U-phase, V-phase, and W-phase, which are turned predetermined number of times. The ends (not shown) of these coils 34c of the U-phase, V-phase, and W-phase are electrically connected together by a star connection (Y connection) method. A method of connecting the coils 34c together is not limited to the star connection method. The coils 34c, for example, may be connected by other connection methods, such as delta connection (triangular connection) method.

The coils 34c are electrically connected to a control board 70 (see FIGS. 4 and 6) fixed to the inside of the gear cover 60, via a wiring unit (not shown) disposed in the housing 30. Each coil 34c is supplied in a predetermined timing with a drive current from a switching element 71 (see FIG. 6) mounted on the control board 70. This generates an electromagnetic force at the stator core 34. As a result, a rotor 35 inside the stator core 34 is rotated by a predetermined driving torque in a predetermined direction of rotation.

Inside the stator core 34 in its radial direction, the rotor 35 is rotatably placed via a predetermined gap (air gap). The rotor 35 is formed into a substantially columnar shape by stacking and bonding together a plurality of steel sheets (not shown), which are magnetic elements. As shown in FIG. 7, the radial outer surface of the rotor 35 is fitted with a permanent magnet 35a of a substantially cylindrical shape.

The permanent magnet 35a is disposed such that its magnetic poles are arranged alternately (at 90-degree intervals, which are not shown) along the circumference of the rotor 35. In this manner, a brushless motor of a surface permanent magnet (SPM) structure, in which the permanent magnet 35a is fitted to the surface of the rotor 35, is adopted as the wiper motor 20. However, in place of the brushless motor of the SPM structure, a brushless motor of an interior permanent magnet (IPM) structure, in which a plurality of permanent magnets are buried in the rotor 35, may also be adopted. Another type of a motor may also be adopted, in which one permanent magnet 35a is replaced with four permanent magnets each having a substantially arcuate sectional shape in a direction intersecting with the axis of the rotor 35, which four permanent magnets are arranged at equal intervals along the circumference of the rotor 35 such that their magnetic poles are arranged alternately. These permanent magnets may be arranged in such a way as to provide not only four magnetic poles but also two magnetic poles or more than four magnetic poles.

As shown in FIGS. 3 and 7, one end side of the rotating shaft 36 in its axial direction (right-hand side in FIGS. 3 and 7) is fixed to the axis of the rotor 35. On the other end side of the rotating shaft 36 in its axial direction (left-hand side in FIG. 7), a worm 36b is formed integrally, which has spiral teeth 36a formed by rolling, etc. The worm 36b formed on the rotating shaft 36 is disposed closer to the speed reduction mechanism housing unit 32 than the through-hole 31c, and the worm 36b and a worm wheel 40 engaging with the worm 36b jointly make up a speed reduction mechanism SD.

Between the rotor 35 and the worm 36b along the axial direction of the rotating shaft 36, a first ball bearing 37 is disposed. The first ball bearing 37 is composed of an outer ring 37a and an inner ring 37b, which are made of steel, and a plurality of steel balls 37c set between the outer ring 37a and the inner ring 37b. The inner ring 37b is fixed to the rotating shaft 36 by fixing means (not shown), such as stopper ring and caulking means. The outer ring 37a is fitted in a first bearing fitting portion 38 disposed between the motor housing unit 31 and the speed reduction mechanism housing unit 32 of the housing 30.

Here, the first ball bearing 37 is pressed and fixed to the first bearing fitting portion 38 by an elastic stopper 39. Fixing the first ball bearing 37 to the first bearing fitting portion 38 makes the rotating shaft 36 incapable of moving in its axial direction. This allows the rotating shaft 36 to rotate smoothly without rattling in its axial direction in the housing 30.

As shown in FIG. 7, the other end of the rotating shaft 36 in its axial direction (left-hand side in FIG. 7) is fitted with a second ball bearing 41. Similar to the first ball bearing 37, the second ball bearing 41 is composed of an outer ring 41a and an inner ring 41b, which are made of steel, and a plurality of steel balls (not shown) set between the outer ring 41a and the inner ring 41b. As shown in FIG. 9, the diameter d1 of the second ball bearing 41 is determined to be smaller than the diameter d2 of the first ball bearing 37 (d1<d2). Because the first ball bearing 37 has the function of supporting the rotating shaft 36 in such a way as to allow it to rotate freely and to make the rotating shaft 36 incapable of moving in the axial direction, the first ball bearing 37 must be large and sturdy. The second ball bearing 41, on the other hand, has the single function of suppressing the rattling of the other end side of the rotating shaft 36 in its axial direction. The second ball bearing 41 of a small size, therefore, suffices for its function.

Additionally, according to this embodiment, the wiper motor 20 is reduced in size by adopting a brushless motor as the wiper motor 20 and increasing the reduction gear ratio of the speed reduction mechanism SD. As a result, the intervals between the teeth 36a of the worm 36b are narrow and the worm 36b rotates at higher speed. For this reason, according to this embodiment, the second ball bearing 41 is provided to suppress the rattling of the worm 36b of the rotating shaft 36 to improve rotation efficiency. However, the second ball bearing 41 may be omitted if the required reduction gear ratio of the speed reduction mechanism SD (specifications of the wiper motor) is achieved.

As shown in FIG. 7, an annular first sensor magnet MG1 is fixed between the worm 36b and the first ball bearing 37 which are aligned along the axial direction of the rotating shaft 36. The first sensor magnet MG1 has magnetic poles (S-poles and N-poles) appearing alternately along its circumference, and rotates together with the rotating shaft 36. The part of control board 70 which is counter to the first sensor magnet MG1 carries a first rotation sensor (not shown), which is a magnetic sensor, such as Hall IC and MR sensor. This rotation sensor detects the rotation status of the rotating shaft 36.

As shown in FIGS. 2 and 5, the speed reduction mechanism housing unit 32 is formed substantially into a bottomed bathtub shape. The speed reduction mechanism housing unit 32 has a bottom 32a and a side wall 32b encircling the bottom 32a. The part of side wall 32b which is opposite to the bottom 32a (upper side in FIG. 5) forms an opening 32c. The bottom 32a and the opening 32c are opposite to each other in the axial direction of the worm wheel 40. The opening 32c is closed with the gear cover 60 (see FIG. 6).

On the bottom 32a of the speed-reduction mechanism housing unit 32, a boss 32d is integrally formed, and projects toward the outside of the speed-reduction mechanism housing unit 32 (i.e., projects upward in figure). The side wall 32b of the speed-reduction mechanism housing unit 32 is provided with three fitting legs 32e formed integrally on the side wall 32b, and they project toward the boss 32d in the radial direction of an output shaft 41. These fitting legs 32e have rubber bushes RB attached respectively thereto. As a result, when the brushless wiper motor 20 is mounted to the vehicle 10 (see FIG. 1), the vibrations of the brushless wiper motor 20 are hardly transmitted to the vehicle 10. Likewise, the vibrations of the vehicle 10 are hardly transmitted to the brushless wiper motor 20.

As shown in FIGS. 3 to 5, the worm wheel 40 is housed rotatably in the speed-reduction mechanism housing unit 32. The worm wheel 40 is made of, for example, polyacetal (POM) resin into a substantially disc shape, and has gear teeth 40a (teeth portion) formed on an outer periphery of the worm wheel 40. The gear teeth 40a of the worm wheel 40 are in engagement with the teeth 36a of the worm 36b. A meshing engagement part of the gear teeth 40a and the teeth 36a is defined as "mating part MT".

The output shaft 42 (see FIG. 2) has a base end side fixed to the axis of the worm wheel 40, and is rotatably supported by the boss 32d of the speed-reduction mechanism housing unit 32. The output shaft 42 has a tip end side extending out of the speed-reduction mechanism housing unit 32, and is fitted with the power transmitting mechanism 14 (see FIG. 1) fixed to the tip end portion of the output shaft 42. As a result, the output shaft 42 is rotated by the rotor 35 (see FIG. 3). Specifically, a rotating speed of the rotating shaft 36 is reduced by the speed-reduction mechanism SD, and a high torque output generated by this speed-reduction process is transmitted from the output shaft 42 to the power transmitting mechanism 14, and causes the wipers 15a and 15b(see FIG. 1) to oscillate. In this manner, the speed-reduction mechanism SD transmits the rotation of the rotor 35 to the wipers 15a and 15b through the power transmitting mechanism 14.

On the side opposite along the axis of the worm wheel 40 to the side on which the output shaft 42 is disposed, a disc-shaped second sensor magnet MG2 is fixed, as shown in FIG. 5. In the second sensor magnet MG2, magnetic poles (S-poles and N-poles) appear alternately along its circumference, and the second sensor magnet MG2 rotates together with the worm wheel 40. The control board 70 has part which is counter to the second sensor magnet MG2 and carries a second rotation sensor (not shown), which is a magnetic sensor, such as Hall IC and MR sensor. This rotation sensor detects the rotation status of the worm wheel 40.

As shown in FIG. 5, a second bearing fitting portion 43 is formed on the side wall 32b of the speed reduction mechanism housing unit 32. The second bearing fitting portion 43 is set coaxial with the first bearing fitting portion 38, and has the second ball bearing 41 fitted in the second bearing fitting portion 43. The second ball bearing 41 is fitted in the second bearing fitting portion 43 by putting the second ball bearing 41, which is attached to the other end of the rotating shaft 36 in its axial direction, through the through-hole 31c and the first bearing fitting portion 38.

Additionally, the second ball bearing 41 is not press fitted into the second bearing fitting portion 43, but is so loosely fitted in the second bearing fitting portion 43 as to form a slight clearance. As a result, for example, even if the first bearing fitting portion 38 and the second bearing fitting portion 43 become slightly out of their coaxial arrangement at manufacturing of the housing 30, the rotation resistance of the rotating shaft 36 does not increase.

As shown in FIGS. 2, 3, and 5, the motor cover 50 is of a bottomed cylindrical shape, and has a substantially disc-shaped bottom 51 and a cylindrical wall 52 encircling the bottom 51. At the center of the bottom 51, a recession 51a recessed toward the cylindrical wall 52 is formed. The recession 51a is formed to enhance the strength of the bottom 51, and this means that the recession 51a on the bottom 51 makes it difficult for the bottom 51 to warp. This prevents the motor cover 50 from resonating with the vibrations of the wiper motor 20 on operation, thereby improving the stillness of the wiper motor 20.

On the part of cylindrical wall 52 which is closer to the motor housing unit 31, the fitting portion 52a, which is fitted on the cover fitting portion 31a of the motor housing unit 31, is formed, as shown in FIG. 3. This fitting portion 52a is annular, similar to the cover fitting portion 31a, and formed into a stepped shape so that the fitting portion 52a mates with the cover fitting portion 31a.

As shown in FIGS. 4 and 6, the gear cover 60 is a cover for sealing the opening 32c of the speed reduction mechanism housing unit 32, and therefore has the same outline as that of the opening 32c. The gear cover 60 has a bottom wall 61 and a side wall 62. To the interior of the gear cover 60 which corresponds to the bottom wall 61, the control board 70 is fixed, using a fixing screw SC. The control board 70 carries a plurality of electronic components EP. To prevent these electronic components EP from interfering with each other, recessions CP (see parts indicated by two-dot chain lines in FIG. 6) are formed on the interior of the bottom wall 61.

On the side wall 62 of the gear cover 60, a connector connection 62a is formed integrally, to which an external connector (not shown) from the vehicle 10 is connected. Inside the connector connection 62a, terminals on first ends (not shown) of a plurality of conductive members are exposed. Terminals on the other ends (not shown) of the conductive members are electrically connected to the control board 70.

In this manner, between the speed reduction mechanism housing unit 32 and the gear cover 60 sealing the opening 32c of the speed reduction mechanism housing unit 32, the speed reduction mechanism SD, which is a mechanical element, and the control board 70, which is an electric element, are placed close to each other such that they are put on top of each other. In this arrangement, to prevent grease "G" applied to the speed reduction mechanism SD (see FIG. 10) from attached to the control board 70, an anti-scattering cover 80 for grease (see FIG. 4) is disposed between the speed reduction mechanism SD and the control board 70.

According to this embodiment, this anti-scattering cover for grease is incorporated in the wiper motor, etc., in which the speed reduction mechanism SD and the control board 70 are arranged close to each other. The present invention offers the anti-scattering cover for grease of a devised shape. The structure of the anti-scattering cover 80 for grease, which is a primary part of the present invention, will hereinafter be described in detail, referring to drawings.

As shown in FIGS. 4, 6, 7, and 8, the anti-scattering cover 80 for grease is made of plastic material into a substantially tabular shape, and makes up a grease holding member of the present invention. As shown in FIG. 4, with the anti-scattering cover 80 for grease being disposed between speed reduction mechanism SD, the control board 70 has a substantially L-shaped section along a direction intersecting with the axial direction of the worm 36b. The anti-scattering cover 80 for grease is disposed closer to the opening 32c than the worm wheel 40 along the axial direction of the worm wheel 40, and holds grease "G" applied to the mating part MT where the worm 36b and the worm wheel 40 are in engagement with each other.

The anti-scattering cover 80 for grease has a first wall 81 and a second wall 82, and these walls are substantially at right angles (approximately 90 degrees) with each other. The first wall 81 extends from the opening 32c of the speed reduction mechanism housing unit 32 toward the bottom 32a, and is disposed between the worm 36b and the side wall 32b of the speed reduction mechanism housing unit 32. The second wall 82 extends in a direction intersecting with the first wall 81, and covers the mating part MT from the side closer to the opening 32c along the axial direction of the worm wheel 40.

As shown in FIG. 8, the second wall 82 is formed into a substantially rectangular shape, with the first wall 81 formed integrally on the part of the second wall 82 which is closer to its one short side along its longitudinal direction (upper side in FIG. 8). On the part of the second wall 82 which is closer to the other short side of the second wall 82 along its longitudinal direction (lower side in FIG. 8), a hole 82a is formed. In a space of the hole 82a which is closer to the worm wheel 40, the second sensor magnet MG2 is placed. In a space of the hole 82a which is closer to the control board 70, a second rotation sensor (not shown) is placed.

In this manner, the hole 82a is formed to allow the second sensor magnet MG2 and the second rotation sensor to face each other without interposing the second wall 82 between them. This improves the detection accuracy of the second rotation sensor. Additionally, since the hole 82a is formed at a location corresponding to the axis of the worm wheel 40 which is separated from the mating part MT, grease "G" hardly scatters to the hole 82a. The detection accuracy of the second rotation sensor can therefore be maintained for a long period.

As shown in FIG. 4, the first wall 81 and the second wall 82 are connected to each other so that their overall sectional shape is an arcuate portion with a gradually curved outline. Hence, an arcuate portion 83 is formed between the first wall 81 and the second wall 82. Inside the arcuate portion 83 in the radial direction, the outer periphery of the teeth 36a of the worm 36b is placed close to the arcuate portion 83. In this arrangement, therefore, grease "G" applied to the teeth 36a of the worm 36b is caused to stick to the first wall 81, the second wall 82, and the arcuate portion 83 and remain held there, by a centrifugal force generated by the rotating worm 36b. When the amount of grease "G" held by the first wall 81, the second wall 82, and the arcuate portion 83 increases, grease "G" is scraped off by the teeth 36a of the worm 36b and brought back to the teeth 36a. This process prevents exhaustion of grease "G" on the mating part MT.

As shown in FIG. 8, the anti-scattering cover 80 for grease has a pair of third walls 84, in the same manner as the first and second walls 81 and 82. The third walls 84 are extended respectively at both sides of the worm 36b in its axial direction, from the opening 32c toward the bottom 32a (toward this side in FIG. 7) in the same manner as the first wall 81, as shown in FIG. 7.

Furthermore, the pair of third walls 84 has respective cutouts 84a which prevent the third walls 84 from coming in contact with small-diameter shaft portions 36c (see FIG. 7) respectively formed on both sides of the worm 36b in its axial direction. The cutouts 84a are open toward the bottom 32a of the speed reduction mechanism housing unit 32. This allows the anti-scattering cover 80 for grease to be brought and placed in the speed reduction mechanism housing unit 32 from the same side as the opening 32c.

Here, each small-diameter shaft portion 36c has a diameter which is determined to be substantially equal to or smaller than a diameter of the rotating shaft 36. In other words, the teeth 36a of the worm 36b have an outer diameter which is determined to be larger than the diameter of the rotating shaft 36. Between the cutout 84a and the small-diameter shaft portion 36c, a minute gap preventing them from coming in contact with each other is formed. As a result, grease "G" likely to move in the axial direction of the worm 36b from the mating part MT by rotation of the worm 36b is dammed up by the pair of third walls 84. In other words, the pair of third walls 84 has a function of holding grease "G", and this function is the same as those of the first wall 81, the second wall 82, and the arcuate portion 83.

As shown in FIGS. 4 and 8, the anti-scattering cover 80 for grease has four first projections 85. The first projections 85 are arranged at substantially equal intervals between the pair of third walls 84, and project toward the worm 36b in a direction intersecting with the axial direction of the worm 36b. As a result, a gap formed between each first projection 85 and the worm 36b is made smaller than a gap formed between the arcuate portion 83 and the worm 36b. A gap between each first projection 85 and the worm 36b is substantially the same in size as a gap between the cutout 84a and the small-diameter shaft portion 36c. Each first projection 85, therefore, dams up grease "G" likely to move in the axial direction of the worm 36b from the mating part MT.

Here, as shown in FIG. 4, each first projection 85 is extended along the circumference of the worm 36b. The length of each first projection 85 along the circumference of the worm 36b is greater than the length of the arcuate portion 83 along the circumference of the worm 36b. As shown in FIG. 8, the part of each first projection 85 which is closer in its longitudinal direction to the worm wheel 40 is brought closer as much as possible to the worm wheel 40 (which is indicated by a two-dot chain line in FIG. 8). This allows each first projection 85 to more efficiently dam up grease "G" likely to move in the axial direction of the worm 36b from the mating part MT.

Furthermore, the number of the first projections 85 formed between the pair of third walls 84 is not limited to 4 as in the above case, but may be determined to be 3 or less or 5 or more. In such a case, to prevent formation of a sink mark, void, etc., resulting from the complicated shape of a die used for molding (injection molding, etc.) the anti-scattering cover 80 for grease, the optimum number of the first projections 85 should preferably be determined according to a plastic material, etc., to be molded.

As shown in FIG. 8, on the part of each of the paired third walls 84 which is closer to the worm wheel 40, a substantially V-shaped smoothing wall 86 is formed integrally. The smoothing wall 86 has a function of smoothing out the irregularities of grease "G" attached to the gear teeth 40a (see FIG. 7) of the worm wheel 40. Specifically, even if grease "G" attached to the gear teeth 40a is shaped into irregularities by the mating part MT, such grease "G" of the irregular shape is smoothed out as it passes along the smoothing wall 86. This suppresses scattering of grease "G", which is caused to stick to the gear teeth 40a by the centrifugal force of the worm wheel 40, to the surroundings.

In a view seen in the axial direction of the worm wheel 40, the smoothing wall 86 is formed into a shape (approximate V shape) having a pair of end portions 86b and a bent portion 86a sandwiched by the end portion 86b. One end portion 86b is formed closer to the cutout 84a, while the other end portion 86b is formed on the part of third wall 84 which is opposite to the first projection 85.

The projecting part of the bent portion 86a of the smoothing wall 86 is directed toward the gear teeth 40a of the worm wheel 40. The bent portion 86a of the smoothing wall 86 is thus placed closer to the gear teeth 40a than the other end portion 86b. Specifically, as shown in FIG. 10A, a gap t1 between the gear teeth 40a and the bent portion 86a is smaller than a gap t2 between the gear teeth 40a and the other end portion 86b (t1<t2). As a result, in the state indicated in FIG. 10A, even if grease "G" smoothed out as a result of counterclockwise rotation of the worm wheel 40 spreads outward in the radial direction when the worm wheel 40 rotates clockwise, grease "G" is smoothed out by the other end portion 86b.

As shown in FIGS. 4 and 8, the anti-scattering cover 80 for grease has one second projection 87 formed along the horizontal direction of the second wall 82. This second projection 87 is disposed opposite to the first wall 81 of anti-scattering cover 80 for grease which is formed around the worm 36b, and projects toward the worm wheel 40 in a direction intersecting with the axial direction of the worm 36b. As shown in FIG. 4, a gap formed between the second projection 87 and the side face of the worm wheel 40 is substantially the same in size as the gap between the cutout 84a and the small-diameter shaft portion 36c, in the same manner as that of the first projection 85. Therefore, this allows the second projection 87 to dam up grease "G" attached from the mating part MT to the side face of the worm wheel 40 and likely to move further.

To assemble the wiper motor 20, the stator core 34 is press fitted first into the motor housing unit 31 of the housing 30, and fixed in the motor housing unit 31 (see FIG. 3). Subsequently, the rotating shaft 36 fitted with the first ball bearing 37, second ball bearing 41, rotor 35, and permanent magnet 35a is prepared. The second ball bearing 41 of the rotating shaft 36 (see FIG. 7) is then put through the through-hole 31c of the housing 30. As a result, the second ball bearing 41 is fitted into the second bearing fitting portion 43 of the hosing 30, while the first ball bearing 37 is fitted into the first bearing fitting portion 38 of the hosing 30. Subsequently, the first ball bearing 37 is fixed to the first bearing fitting portion 38, using the stopper 39.

The worm wheel 40 having the output shaft 42 fixed thereto is then housed in the speed reduction mechanism housing unit 32 of the housing 30. In this process, the output shaft 42 of the worm wheel 40 is faced to the opening 32c and then is put through the boss 32d.

Subsequently, to the interior of the gear cover 60, the control board 70 and the anti-scattering cover 80 for grease are fixed in this order to fit together the gear cover 60, the control board 70, and the anti-scattering cover 80 for grease. In this process, the anti-scattering cover 80 for grease is fitted to the interior of the gear cover 60 to set the anti-scattering cover 80 for grease overlapping the control board 70 such that the first wall 81 of the anti-scattering cover 80 for grease extends in the direction opposite to the control board 70.

Subsequently, the same side of the gear cover 60 as the anti-scattering cover 80 for grease is faced to the opening 32c of the speed reduction mechanism housing unit 32. The gear cover 60 is then brought closer to the speed reduction mechanism housing unit 32 in the same direction in which the worm wheel 40 is brought and placed in the speed reduction mechanism housing unit 32. Hence, the gear cover 60 is fitted to the speed reduction mechanism housing unit 32 of the housing 30. In this manner, the worm wheel 40 and the anti-scattering cover 80 for grease are brought and placed in the speed reduction mechanism housing unit 32 in the same direction through the opening 32c. This allows an assembling robot, etc., capable of simple vertical actions to assemble the wiper motor 20. An assembling process for the wiper motor 20, therefore, can be simplified significantly.

The operation of the wiper motor 20 assembled in the above manner, especially movement of grease "G" applied to the mating part MT will then be described in detail, referring to drawings. To simplify the description, a principle part of the anti-scattering cover 80 for grease is painted with half-dot mesh patterns in FIG. 9 and grease "G" is painted with the same in FIG. 10.

As shown in FIG. 9, when the rotating shaft 36 is rotated in a normal direction, i.e., a direction indicated by an actual line arrow R1, it causes the worm wheel 40 to rotate in the counterclockwise direction indicated by the actual line arrow R1. As a result, part of grease "G" applied to the mating part MT is attached to the first wall 81, the second wall 82 (see FIG. 4), and the arcuate portion 83 (see FIG. 4) and held by them, while the rest of grease "G" applied to the mating part MT tries to move along a direction indicated by a broken line arrow M1.

At this time, the four first projections 85 suppress the move of grease "G" in the direction indicated by the broken line arrow M1, thus holding grease "G" near respective first projections 85, as shown in FIG. 10A. Grease "G" on both sides of the worm 36b in its axial direction is dammed up by the pair of third walls 84 and is consequently held on the interior of the third walls 84 (which is closer to the first projections 85). As grease "G" held on the interior of the third walls 84 increases, the smoothing walls 86 force grease "G" back to spaces between adjacent gear teeth 40a of the worm wheel 40. This means that an irregular mass of grease "G" attached to the gear teeth 40a is smoothed out by the smoothing walls 86.

Furthermore, grease "G" leaving the mating part MT and attached to the side face of the worm wheel 40 which is closer in its axial direction to the anti-scattering cover 80 for grease or to the side face of the anti-scattering cover 80 for grease which is closer to the worm wheel 40 is dammed up by the second projection 87, as shown in FIG. 10A. This prevents the displacement of grease "G" to a location (not shown) distant from the mating part MT. As shown in FIG. 9, when the rotating shaft 36 is rotated in a reverse direction, i.e., a direction indicated by an actual line arrow R2, the worm wheel 40 is rotated in the clockwise direction indicated by the actual line arrow R2. In this case, the anti-scattering cover 80 for grease holds grease "G" in the same manner as in the above case. In this case, even if part of grease "G" moves in the direction indicated by the broken line arrow M1 and climbs over the end portion 86b to spread outward in the radial direction of the worm wheel 40, such part of grease "G" is smoothed by the end portion 86b when grease "G" moves in a direction indicated by a broken line arrow M2. That is, since the gap t1 smaller than the gap t2 (t1<t2) allows grease "G" spreading outward in the radial direction to be smoothed easily, grease "G" is held efficiently by the gear teeth 40a. This prevents exhaustion of grease "G" on the mating part MT, causing a major portion of grease "G" to be held around the worm 36b, as shown in FIG. 10A.

Here, FIG. 10B shows a comparative example in which the wiper motor 20 dispenses with the anti-scattering cover 80 for grease, indicating a case where the wiper motor 20 is rotated in the normal and reverse directions under the same operation condition as that of FIG. 10A. In the case of FIG. 10B, since the wiper motor 20 is NOT provided with an anti-scattering cover 80 for grease, grease "G" is gradually removed from the mating part MT until little grease "G" is left near the mating part MT. This means that in the comparison example of FIG. 10B, grease "G" on the mating part MT is exhausted easily, in which case maintenance work for resupplying grease "G" must be carried out frequently.

As described above, specifically in this embodiment in which the reduction gear ratio of the speed reduction mechanism SD (see FIG. 7) is increased to downsize the wiper motor 20, since the worm 36b is rotated at higher speed, it is important for the anti-scattering cover 80 to have a function to hold grease. Additionally, in order to suppress a drop in assembling efficiency of the wiper motor 20 resulting from downsizing of the wiper motor 20, the anti-scattering cover 80 for grease is set in place along the same direction along which the worm wheel 40 is set in place, which is enabled by this embodiment.

As described in detail above, according to the wiper motor 20 of this embodiment, the anti-scattering cover 80 for grease, which holds grease "G" applied to the mating part MT where the worm 36b and the worm wheel 40 are in engagement with each other, is provided and closer to the opening 32c than the worm wheel 40 along its axial direction. The anti-scattering cover 80 for grease has the first wall 81 extending from the opening 32c toward the bottom 32a and formed between the worm 36b and the side wall 32b of the speed reduction mechanism housing unit 32, and the second wall 82 extending in the direction intersecting with the first wall 81 and covering the mating part MT from the side closer to opening 32c along the axial direction of the worm wheel 40. The first wall 81 and second wall 82 of the anti-scattering cover 80 for grease thus hold grease "G" attached to the worm 36b, thereby preventing exhaustion of grease "G" applied to the mating part MT where worm 36b and the worm wheel 40 are in engagement with each other.

According to the wiper motor 20 of this embodiment, the first wall 81 extends from the opening 32c toward the bottom 32a. This allows the anti-scattering cover 80 for grease to be brought and placed in the speed reduction mechanism housing unit 32 in the same direction in which the worm wheel 40 is brought and placed in the speed reduction mechanism housing unit 32. As a result, an increase in the number of components is suppressed and the assembling process is simplified, compared to the conventional case.

Furthermore, according to the wiper motor 20 of this embodiment, the anti-scattering cover 80 for grease is provided with the pair of third walls 84 which, at both sides of the worm 36b in its axial direction, extend from the opening 32c toward the bottom 32a and have the cutouts 84a preventing the third walls 84 from coming in contact with the worm 36b. This suppresses displacement of grease "G" toward both sides of the worm 36b in its longitudinal direction as the worm 36b rotates.

Furthermore, according to the wiper motor 20 of this embodiment, the first projections 85 projecting toward the worm 36b in the direction intersecting with the axial direction of the worm 36b are formed between the pair of third walls 84 of the anti-scattering cover 80 for grease. This suppresses displacement of grease "G" in the longitudinal direction of the worm 36b more effectively.

Furthermore, according to the wiper motor 20 of this embodiment, since each third wall 84 has the smoothing wall 86 formed on its part closer to the worm wheel 40, and configured to even the irregularities of grease "G" attached to the gear teeth 40a of the worm wheel 40, the irregular mass of grease "G" attached to the gear teeth 40a is smoothed out. In a view in the axial direction of the worm wheel 40, the smoothing wall 86 is of the shape having the bent portion 86a and the pair of end portions 86b sandwiching the bent portion 86a, and the bent portion 86a disposed closer to the worm wheel 40 than the end portions 86b. As a result, grease "G" spreading outward in the radial direction at the reverse rotation of the worm wheel 40 is smoothed by the ends 86.

Furthermore, according to the wiper motor 20 of this embodiment, on the opposite side of the anti-scattering cover 80 for grease from the first wall 81 with respect to the worm 36b, the second projection 87 is formed, and projects toward the worm wheel 40 in the direction intersecting with the axial direction of the worm 36b. The second projection 87 dams up grease "G" attached from the mating part MT to the side face of the worm wheel 40 or the side face of the anti-scattering cover 80 for grease, and likely to move further.

Furthermore, according to the wiper motor 20 of this embodiment, the worm wheel 40 and the anti-scattering cover 80 for grease are brought and placed in the speed reduction mechanism housing unit 32 in the same direction through the opening 32c. This allows an assembling robot, etc., capable of simple vertical actions to assemble the wiper motor 20. The assembling process for the wiper motor 20, therefore, can be simplified significantly.

Next, the second embodiment of the present invention will be described in detail with reference to the drawings. Here, portions the same in function as those of the first embodiment are respectively denoted by the same reference numbers as those of the first embodiment, and detail description thereof is omitted in this embodiment.

Figure 11:
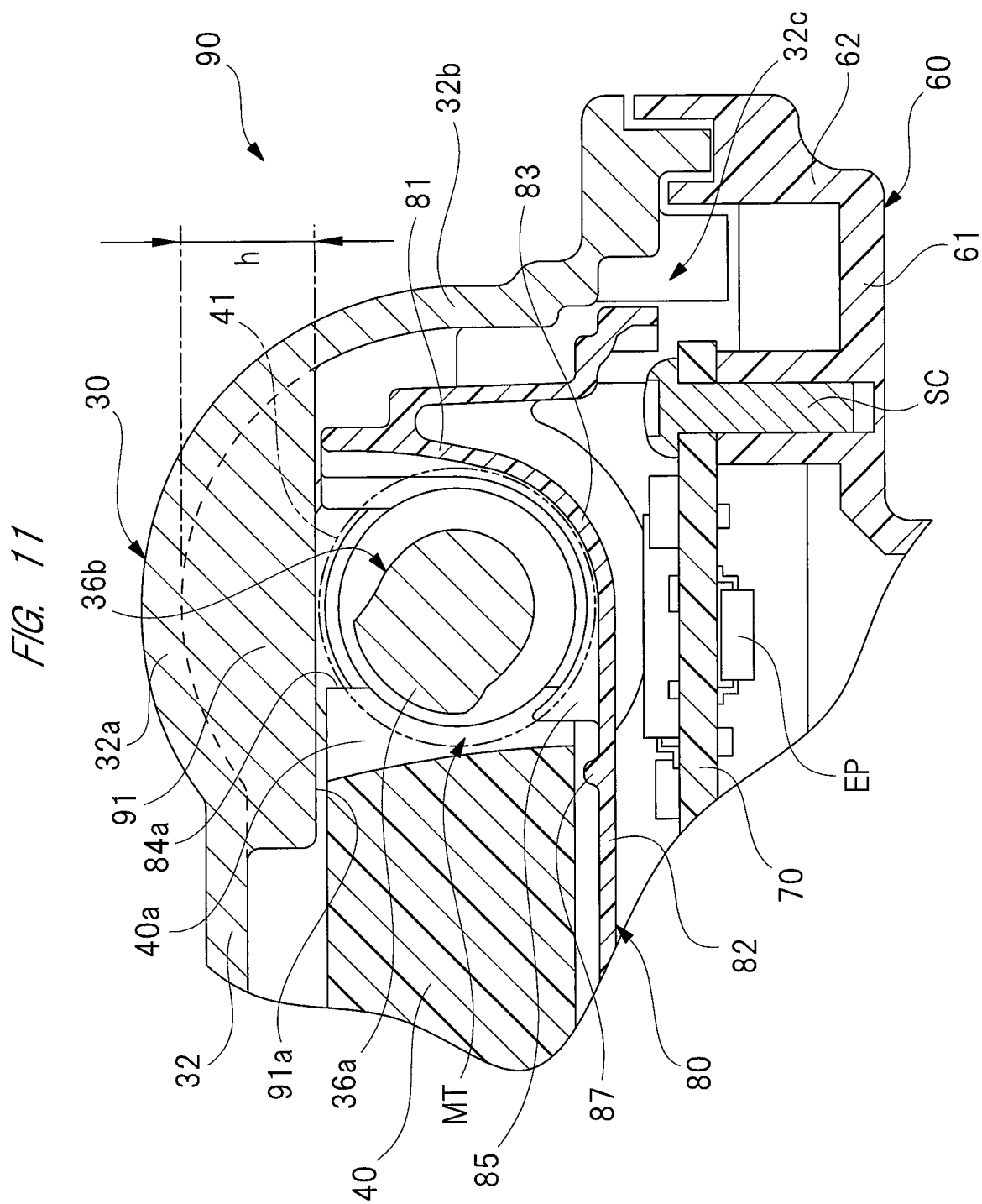
FIG. 11 is a partially enlarged sectional view of a wiper motor according to a second embodiment, the partially enlarged sectional view corresponding to the partially enlarged sectional view of FIG. 4.
Figure 12:
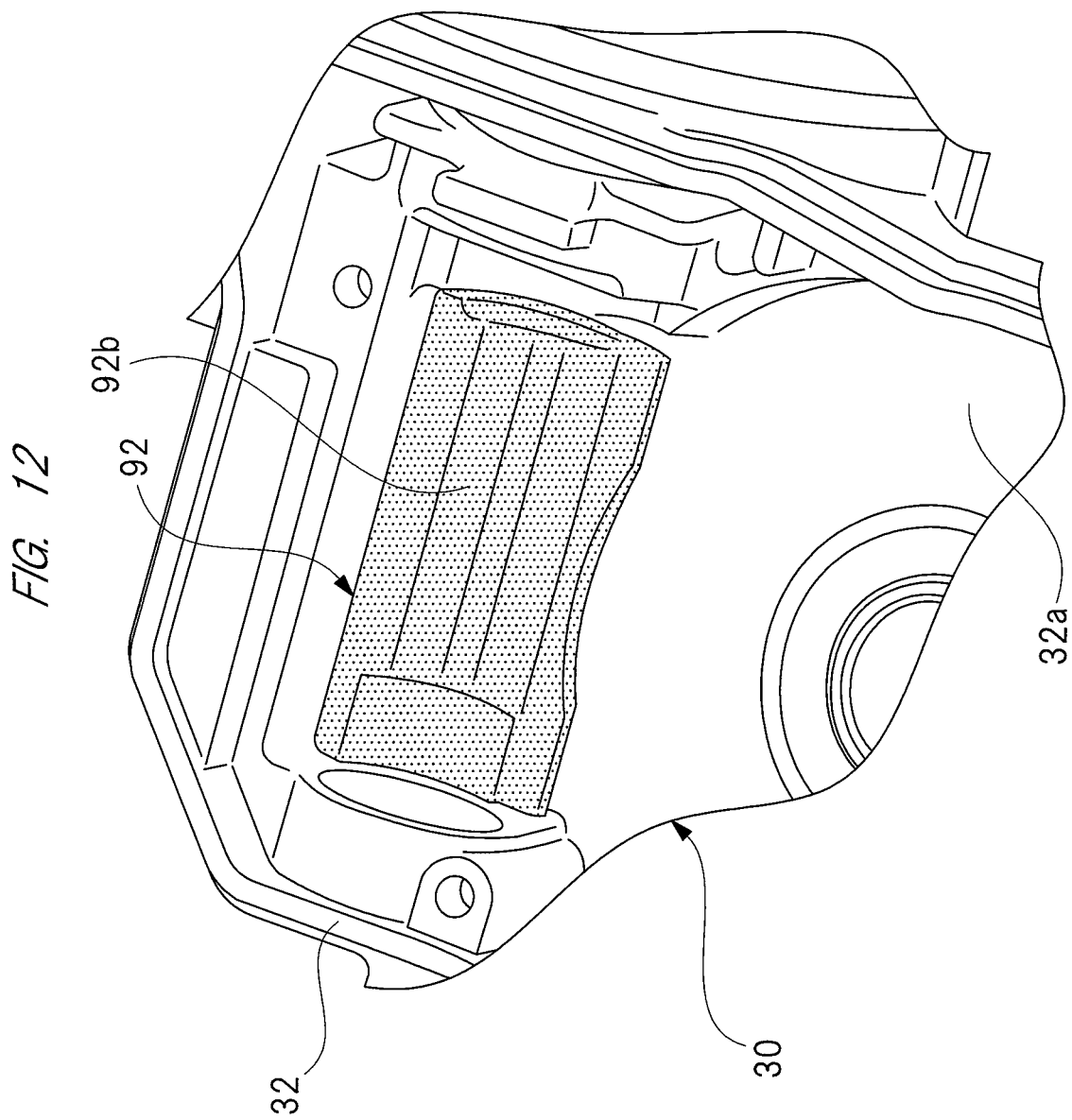
FIG. 12 is a partially enlarged perspective view of the housing, showing a modification of the second embodiment.
Figure 13:
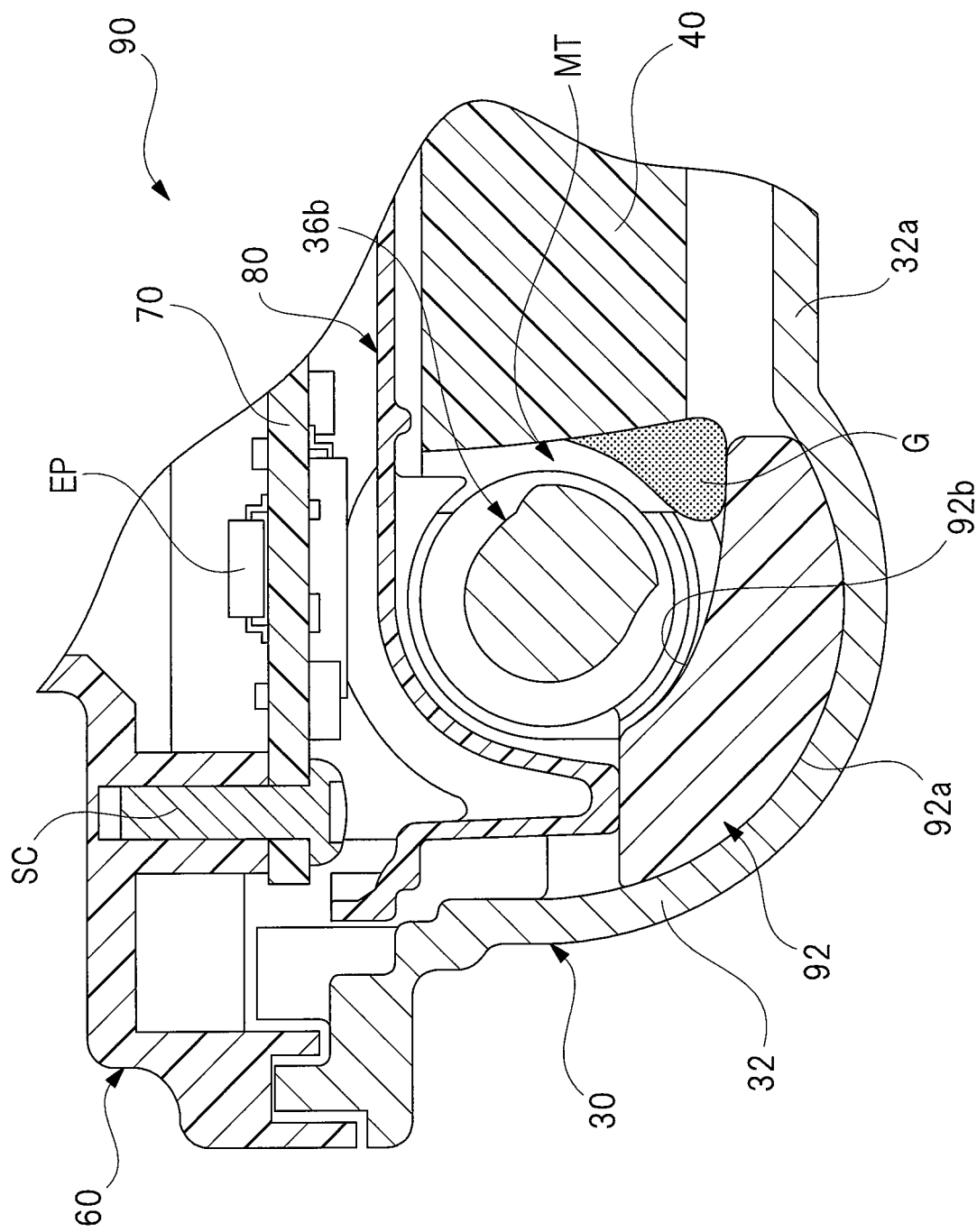
FIG. 13 is a partially enlarged sectional view of a projecting member of FIG. 12.

FIG. 11 is a partially enlarged sectional view of a wiper motor according to a second embodiment, the partially enlarged sectional view corresponding to the partially enlarged sectional view of FIG. 4; FIG. 12 is a partially enlarged perspective view of the housing, showing a modification of the second embodiment; and FIG. 13 is a partially enlarged sectional view of a projecting member of FIG. 12.

As shown in FIG. 11, a wiper motor (motor with speed reduction mechanism) 90 according to the second embodiment is different from the wiper motor 20 (see FIG. 4) according to the first embodiment in that one third projection 91 extending toward the worm 36b is formed on the bottom 32a of the speed reduction mechanism housing unit 32 of the housing 30.

The height "h" of the third projection 91, which represents a degree of projection of the third projection 91 from the bottom 32a, is determined to be a height which does not hamper fitting work of the second ball bearing 41 (see FIG. 5) into the second bearing fitting portion 43 (see FIG. 5). As shown in FIG. 11, in a view in the axial direction of the worm 36b, the second ball bearing 41 and the third projection 91 do not interfere with each other. A plane portion 91a of the third projection 91 can function as a guide which guides the second ball bearing 41 into the second bearing fitting portion 43. Specifically, when the wiper motor 90 is assembled, the second ball bearing 41 is brought into sliding contact with the plane portion 91a. This allows the second ball bearing 41 to be fitted easily into the second bearing fitting portion 43.

The third projection 91 is formed on the opposite side of the speed reduction mechanism housing unit 32 from the first projections 85 with respect to the worm 36b, and in the same manner as the first projections 85, projects toward the worm 36b in the direction intersecting with the axial direction of the worm 36b. The third projection 91 is disposed counter to each first projection 85 with respect to the worm 36b.

The second embodiment having the above configuration offers the same effects as those of the first embodiment. The second embodiment further offers an additional advantage that the third projection 91 reduces the distance between the worm 36b and the bottom 32a, whereby the centrifugal force of the worm 36b gives grease "G" a momentum for scattering onto the bottom 32a, but grease "G" actually lands on the plane portion 91a. Consequently, grease "G" is held near the mating part MT. The second embodiment is thus applied preferably to a wiper motor having the worm 36b which rotates faster than the worm 36b of the first embodiment.

However, instead of the single third projection 91, a plurality of third projections 91 may be formed, in the same manner as the first projections 85. In this case, the first projections 85 and the third projections 91 may be arranged alternately along the axial direction of the worm 36b. To prevent exhaustion of grease "G" on the mating part MT, in this case, a groove formed between adjacent third projections 91 should be carefully determined so as not to have an excessive depth.

FIGS. 12 and 13 depict a modification of the second embodiment of the present invention. The modification may include a projecting member 92 functioning as the third projection.

As shown in FIGS. 12 and 13, the projecting member 92 is equivalent to the above third projection 91, serving as a third projection of the present invention. The projecting member 92 is provided as a component separated from the housing 30, and made of resin material such as plastic, which is different from that of the housing 30, into a predetermined shape.

Specifically, as shown in FIG. 13, the projecting member 92 has a substantially arcuate shape in cross-section along a direction intersecting with the axial direction of the worm 36b. The projecting member 92 has a large-diameter outer peripheral surface 92a and a small-diameter inner peripheral surface 92b. The large-diameter outer peripheral surface 92a is fixed to the bottom 32a of the speed reduction mechanism housing unit 32, using fixing means such as adhesive, and the small-diameter inner peripheral surface 92b faces the outer periphery of the worm 36b in proximity thereto.

According to the modification in which the projecting member 92 is provided as a separate component to the housing 30 in the above manner, grease "G" is held by the mating part MT, as shown in FIG. 13, which offers the same effects as those of the second embodiment.

Next, the third embodiment of the present invention will be described in detail with reference to the drawings. Here, portions the same in function as those of the first embodiment are respectively denoted by the same reference numbers as those of the first embodiment, and detail description thereof is omitted in this embodiment.

Figure 14:
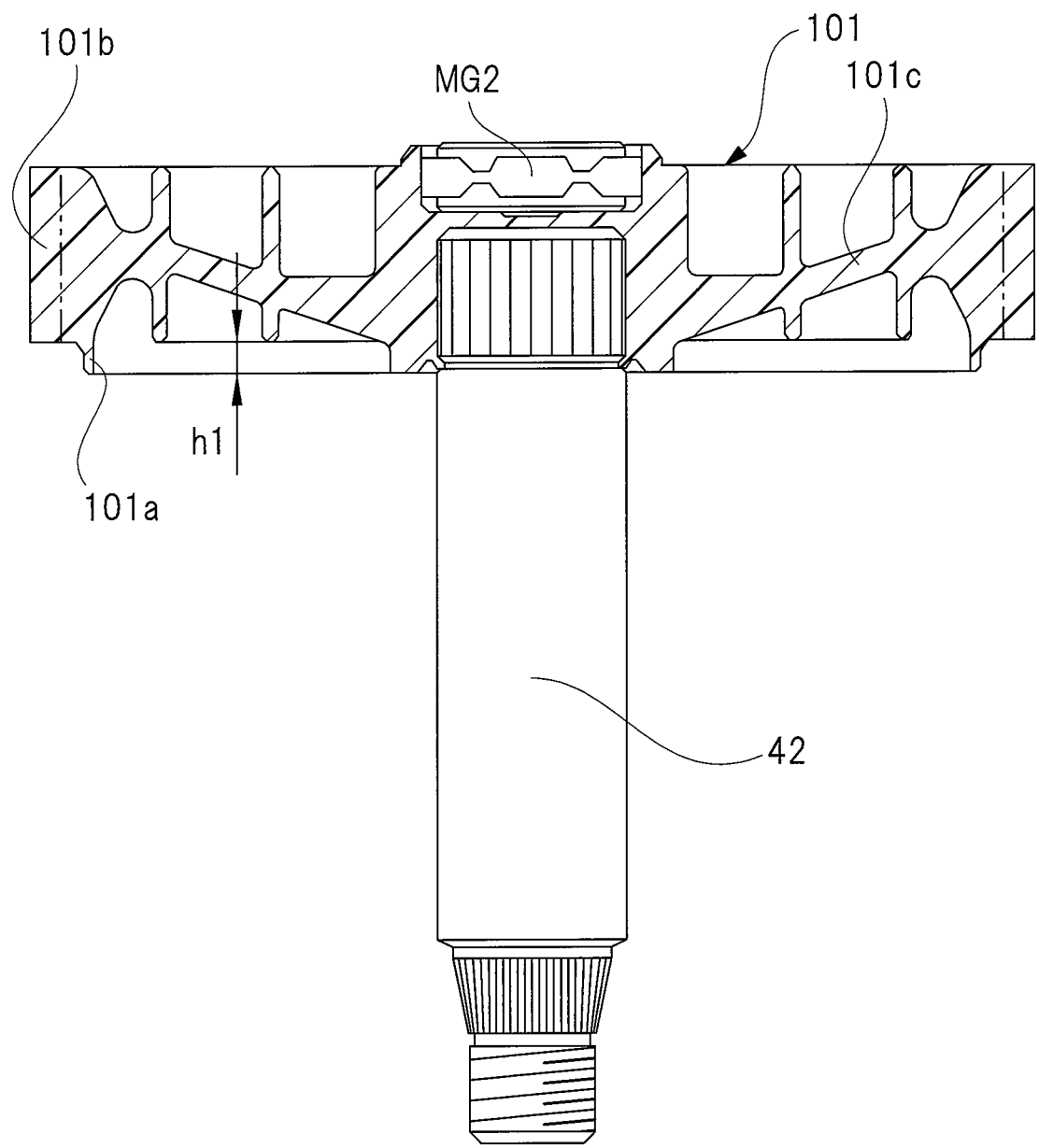
FIG. 14 is a sectional view of a worm wheel of a wiper motor according to a third embodiment.
Figure 15:
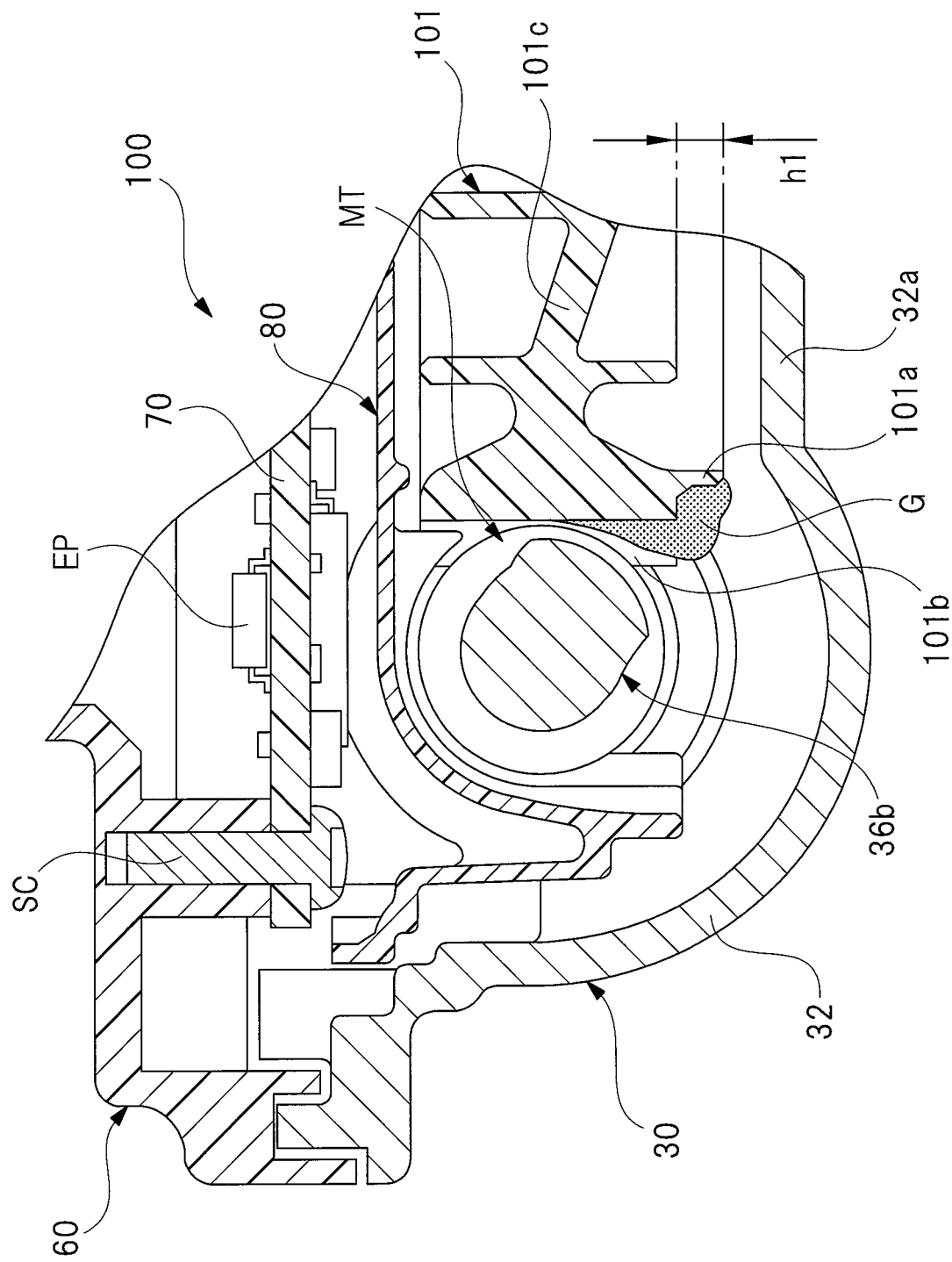
FIG. 15 is a sectional view for explaining a grease holding function of the worm wheel of FIG. 14.
Figure 16:
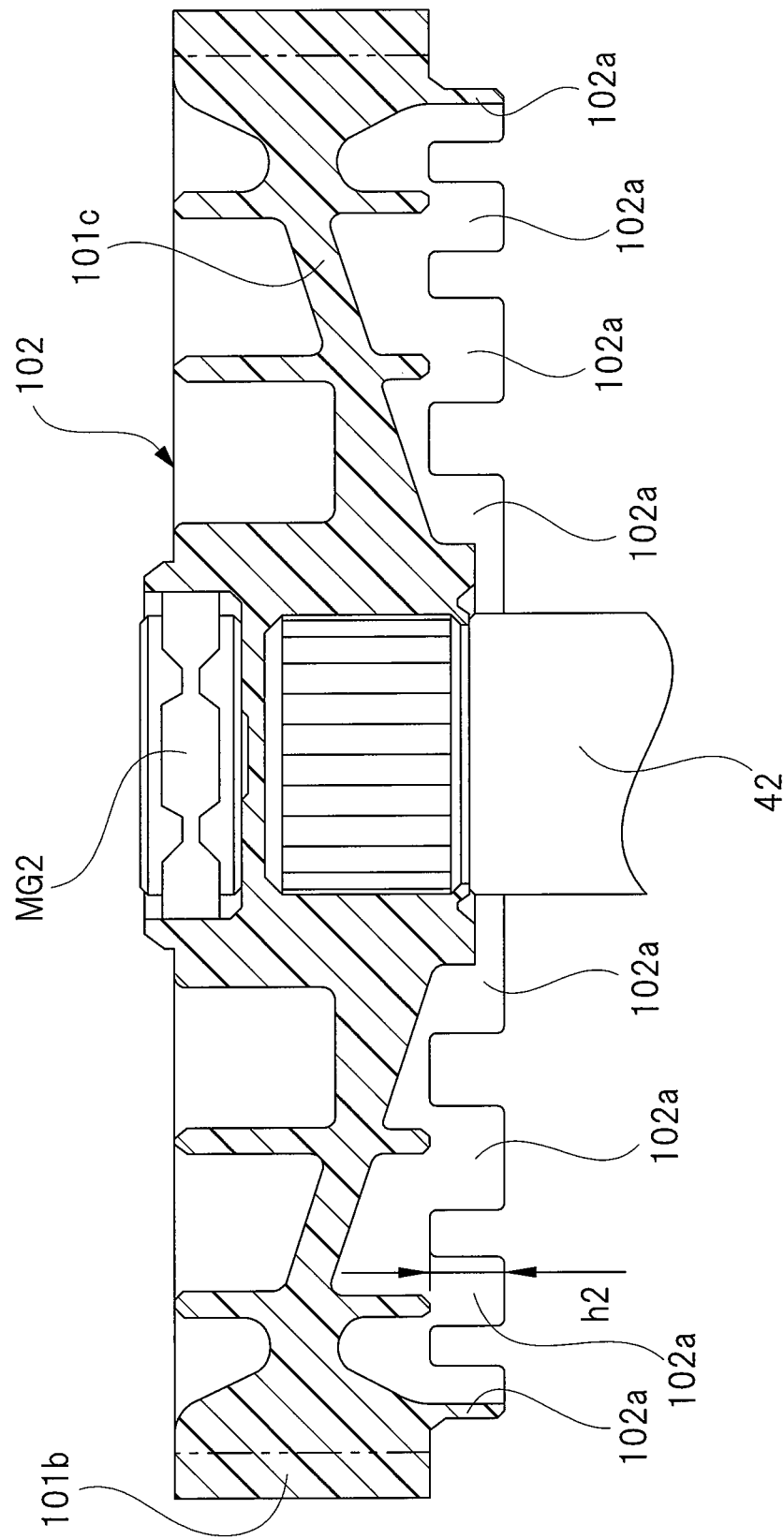
FIG. 16 is a partially enlarged perspective view for explaining a modification of the third embodiment.

FIG. 14 is a sectional view of a worm wheel of a wiper motor according to a third embodiment; FIG. 15 is a sectional view for explaining a grease holding function of the worm wheel of FIG. 14; and FIG. 16 is a partially enlarged perspective view for explaining a modification of the third embodiment.

As shown in FIG. 14, a wiper motor (motor with speed reduction mechanism) 100 according to the third embodiment has a worm wheel 101 whose shape is different from the shape of the worm wheel of the wiper motor 20 (see FIG. 4) according to the first embodiment. As shown in FIGS. 14 and 15, with the worm wheel 101 set in place in the housing 30, an annular grease holding wall 101a, which holds grease "G" likely to move from the mating part MT toward the bottom 32a, is formed on the part of the worm wheel 101 which is closer along its axial direction to the bottom 32a. The grease holding wall 101a has a height h1 determined to be about ⅕ of the thickness of the worm wheel 101, and is disposed close to the gear teeth 101b of the worm wheel 101. This grease holding wall 101a effectively holds grease "G" likely to move from the mating part MT toward the bottom 32a, as shown in FIG. 15.

Here, by the grease holding wall 101a on the part of the worm wheel 101, which is radially closer to its exterior and is closer to the bottom 32a, weight balance between one side and the other side of the worm wheel 101 along its axial direction (molding accuracy deterioration, etc.) may be destroyed. For example, one side of the worm wheel 101 along its axial direction which carries the grease holding wall 101a could become heavier than the other side. To offset this weight balance breakage, the worm wheel 101 is provided with a connecting portion 101c connecting the radially internal part of the worm wheel 101 to the radially external part of the same, and this connecting portion 101c is tapered (sloped). Specifically, as shown in FIG. 14, the radially external part of the connecting portion 101c is disposed opposite to the side of the worm wheel 101 along its axial direction that carries the grease holding wall 101a. This gives the worm wheel 101 a molded form with fine precision, thus effectively suppressing the occurrence of irregular rotation, etc., of the worm wheel 101.

The third embodiment configured in the above manner offers the same effect as offered by the first embodiment. In addition to this, according to the third embodiment, the grease holding wall 101a formed on the part of the worm wheel 101 which is closer to the bottom 32a allows holding a greater portion of grease "G" near the mating part MT.

FIG. 16 shows a modification of the third embodiment of the present invention, in which modification a plurality of grease holding walls 102a are formed intermittently on the worm wheel 102 along its circumference. The height h2 of each of the grease holding walls 102a is determined to be larger than the height h1 of the above grease holding wall 101a of the third embodiment (h2>h1). Specifically, the height h2 of the grease holding wall 102a is determined to be ⅓ of the thickness of the worm wheel 102.

As described above, the modification of the third embodiment of the present invention also obtains the same operations and effects as those of the third embodiment.

Next, the fourth embodiment of the present invention will be described in detail with reference to the drawings. Here, portions the same in function as those of the first embodiment are respectively denoted by the same reference numbers as those of the first embodiment, and detail description thereof is omitted in this embodiment.

Figure 17:
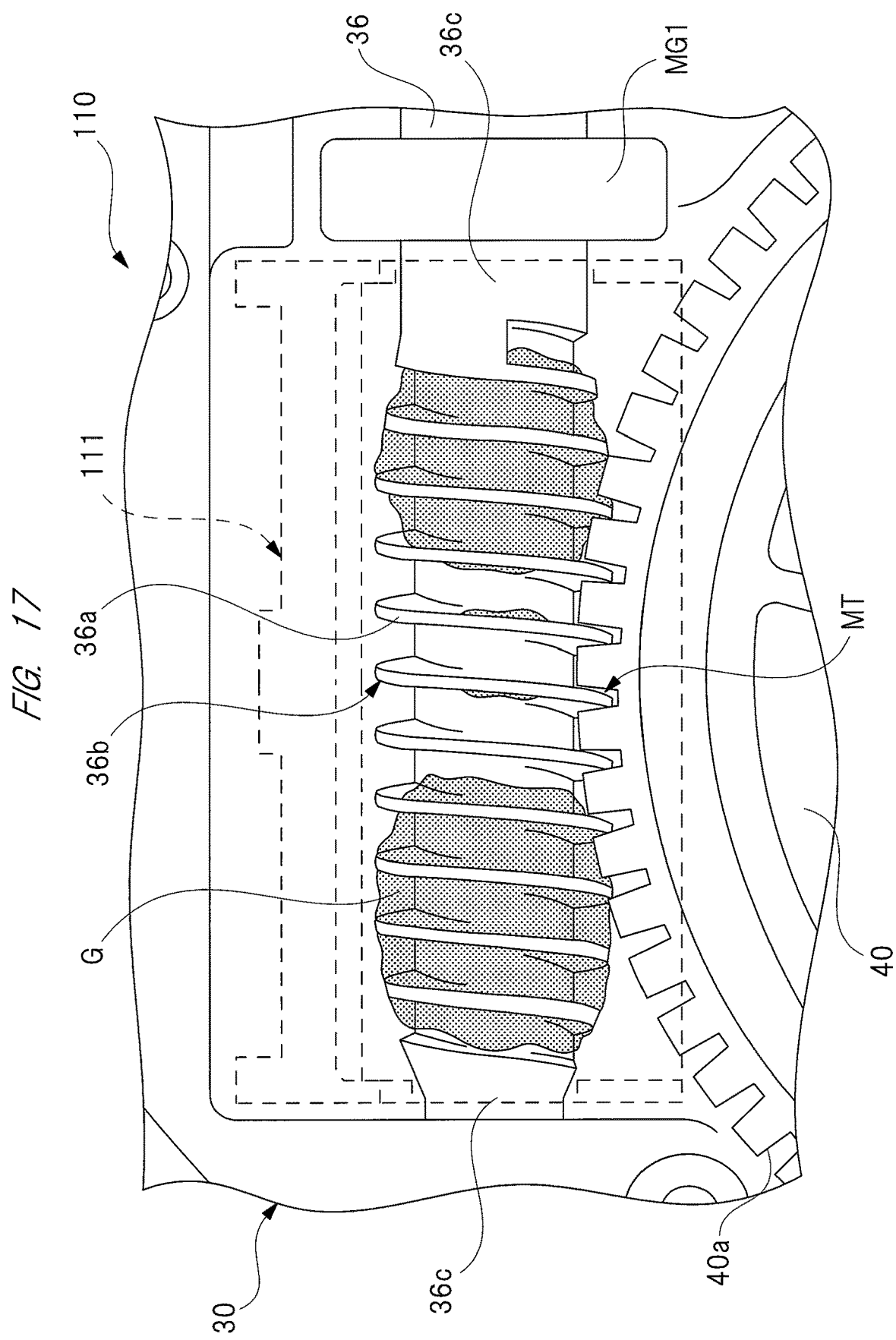
FIG. 17 is a partially enlarged view of a wiper motor according to a fourth embodiment.
Figure 18:
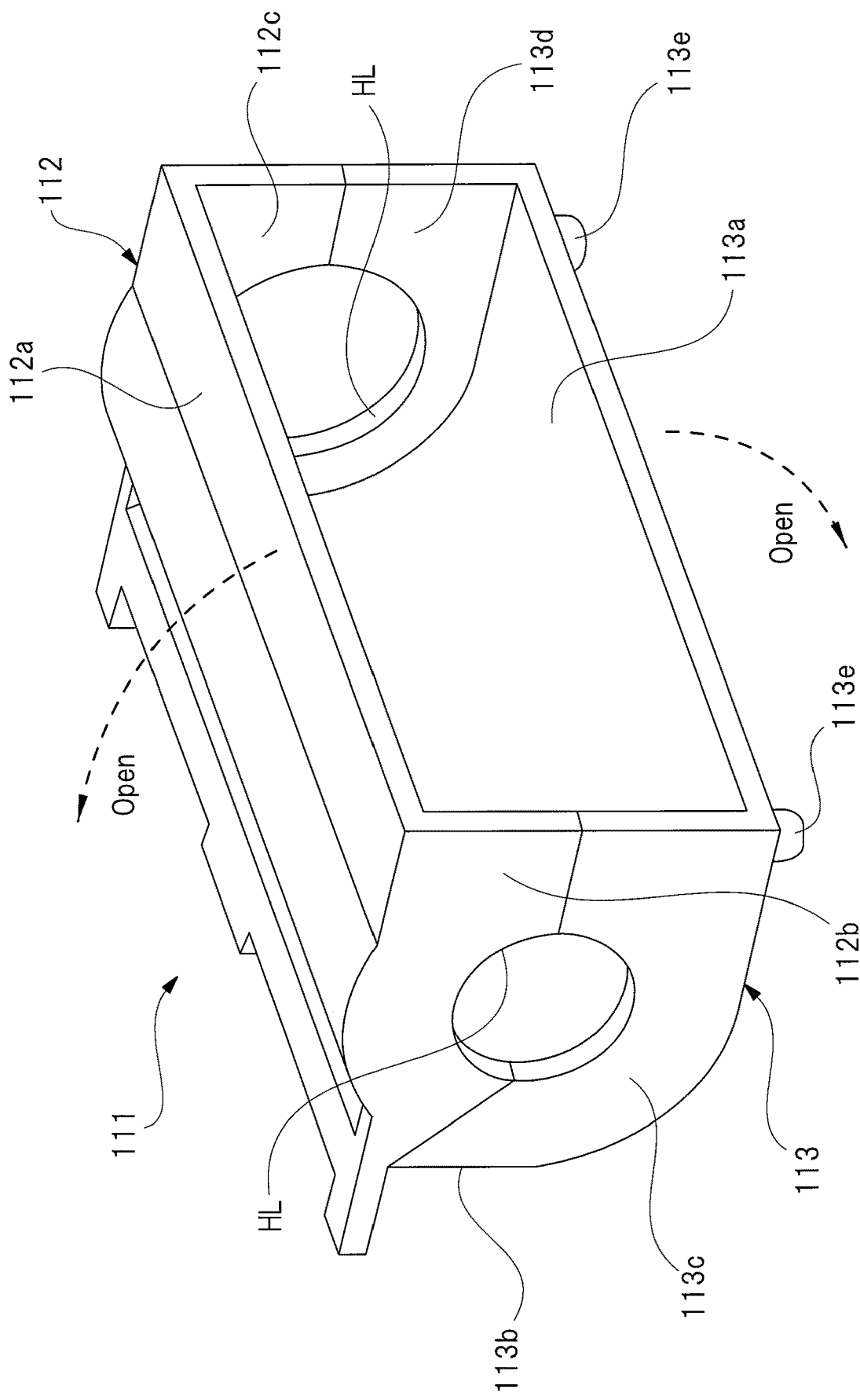
FIG. 18 is an enlarged perspective view of the grease holding member of FIG. 17.

FIG. 17 is a partially enlarged view of a wiper motor according to a fourth embodiment; FIG. 18 is an enlarged perspective view of the grease holding member of FIG. 17; and FIGS. 19A and 19B are partially enlarged sectional views for explaining a procedure of attaching the grease holding member of FIG. 17.

As shown in FIG. 17, a wiper motor (motor with speed reduction mechanism) 110 according to the fourth embodiment is different from the wiper motor 20 (see FIG. 4) according to the first embodiment only in the shape of the grease holding member. Specifically, the anti-scattering cover 80 for grease (grease holding member) of the first embodiment is replaced with a grease holding member 111 having a shape shown in FIG. 18.

Figure 19:
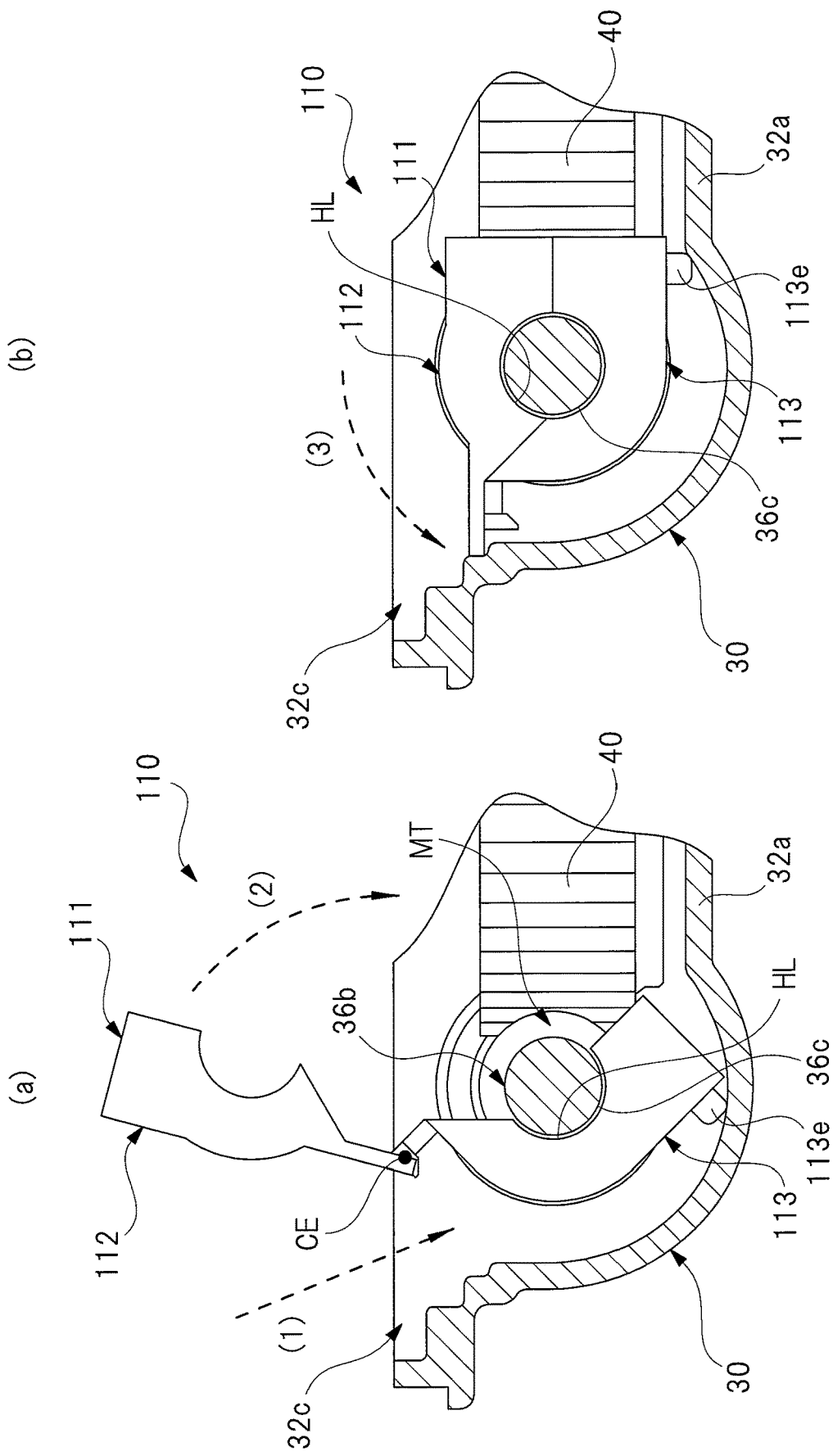
FIGS. 19A and 19B are partially enlarged sectional views for explaining a procedure of attaching the grease holding member of FIG. 17.

As shown in FIGS. 17 to 19B, the grease holding member 111 is made of resin material such as plastic, into a predetermined shape and structured so as to encircle the outer periphery of the worm 36b including the mating part MT. The grease holding member 111 has a first opening/closing element 112 and a second opening/closing element 113, and with the grease holding member 111 disposed around the outer periphery of the worm 36b, the first opening/closing element 112 is disposed closer to the opening 32c of the housing 30, and the second opening/closing element 113 is disposed closer to the bottom 32a of the housing 30. The first opening/closing element 112 and the second opening/closing element 113 are connected to each other via a connecting portion CE (see FIG. 19). As shown in FIG. 19, the part of grease holding member 111, which is disposed on the opposite side from the connecting portion CE with respect to the worm 36b, is opened and closed around the connecting portion CE.

As shown in FIG. 18, the first opening/closing element 112 has a first flat portion 112a forming a second wall of the present invention, and first and second vertical portions 112b and 112c forming a third wall of the present invention. The second opening/closing element 113 has a second flat portion 113a forming a fourth wall of the present invention, a third vertical portion 113b forming a first wall of the present invention, and fourth and fifth vertical portions 113c and 113d forming the third wall of the present invention. The second flat portion 113a extends in a direction intersecting with the third vertical portion 113b, and covers the mating part MT from the side closer to the bottom 32a along the axial direction of the worm wheel 40.

On the first and fourth vertical portions 112b and 113c and the second and fifth vertical portions 112c and 113d of the grease holding member 111 in its closed state, through-holes HL are respectively formed, and prevent the vertical portions from coming in contact with the small-diameter shaft portions 36c (see FIG. 17) formed on both sides of the worm 36b in its axial direction, as shown in FIG. 18. The through-holes HL thus serves as cutouts of the present invention.

Furthermore, as shown in FIG. 18, on both sides of the second opening/closing element 113 in its longitudinal direction, a pair of sliding contact projections 113e are respectively formed, which project from the exterior of the second opening/closing element 113. These sliding contact projections 113e come in sliding contact with the bottom 32a of the housing 30 when the grease holding member 111 is set in place around the worm 36b.

In order to set the grease holding member 111 around the worm 36b, the grease holding member 111 is opened first around the connecting portion CE (see FIG. 19A), as indicated by a broken line arrow in FIG. 18. In this step, the first opening/closing element 112 is separated from the second opening/closing element 113 to leave the grease holding member 111 wide open, as shown in FIG. 19A. Subsequently, as indicated by a broken line arrow (1) in FIG. 19A, the second opening/closing element 113 is slipped into a space between the housing 30 and the worm 36b, after which the through-holes HL are matched in position to the small-diameter shaft portions 36c of the worm 36b. Subsequently, the grease holding member 111 is closed, as indicated by a broken line arrow (2), and rotated counterclockwise around the worm 36b, as indicated by a broken line arrow (3) in FIG. 19B. This puts the grease holding member 111 completely closed, in which state the grease holding member 111 encircles the outer periphery of the worm 36b including the mating part MT. When the grease holding member 111 is rotated counterclockwise around the worm 36b, each sliding contact projection 113e comes in contact with the bottom 32a. This allows the grease holding member 111 to be set smoothly and to be closed completely, as shown in FIG. 19B.

The fourth embodiment configured in the above manner offers the same effects as those of the first embodiment. In addition, according to the fourth embodiment, the grease holding member 101 placed in such a way as to encircle the outer periphery of the worm 36b including the mating part MT further ensures prevention of scattering of grease "G" to the surroundings.

Furthermore, the centrifugal force generated by the worm 36b causes grease "G" to move and circulate inside the grease holding member 111. This further ensures prevention of exhaustion of grease "G" on the mating part MT. A wiper motor with a higher reduction gear ratio, therefore, can retain sufficient lubrication performance for a long period.

Furthermore, the first opening/closing element 112 and the second opening/closing element 113 are connected to the connecting portion CE. This facilitates component management, thus leading to less cost and improved yield.

Next, the fifth embodiment of the present invention will be described in detail with reference to the drawings. Here, portions the same in function as those of the first embodiment are respectively denoted by the same reference numbers as those of the first embodiment, and detail description thereof is omitted in this embodiment.

Figure 20:
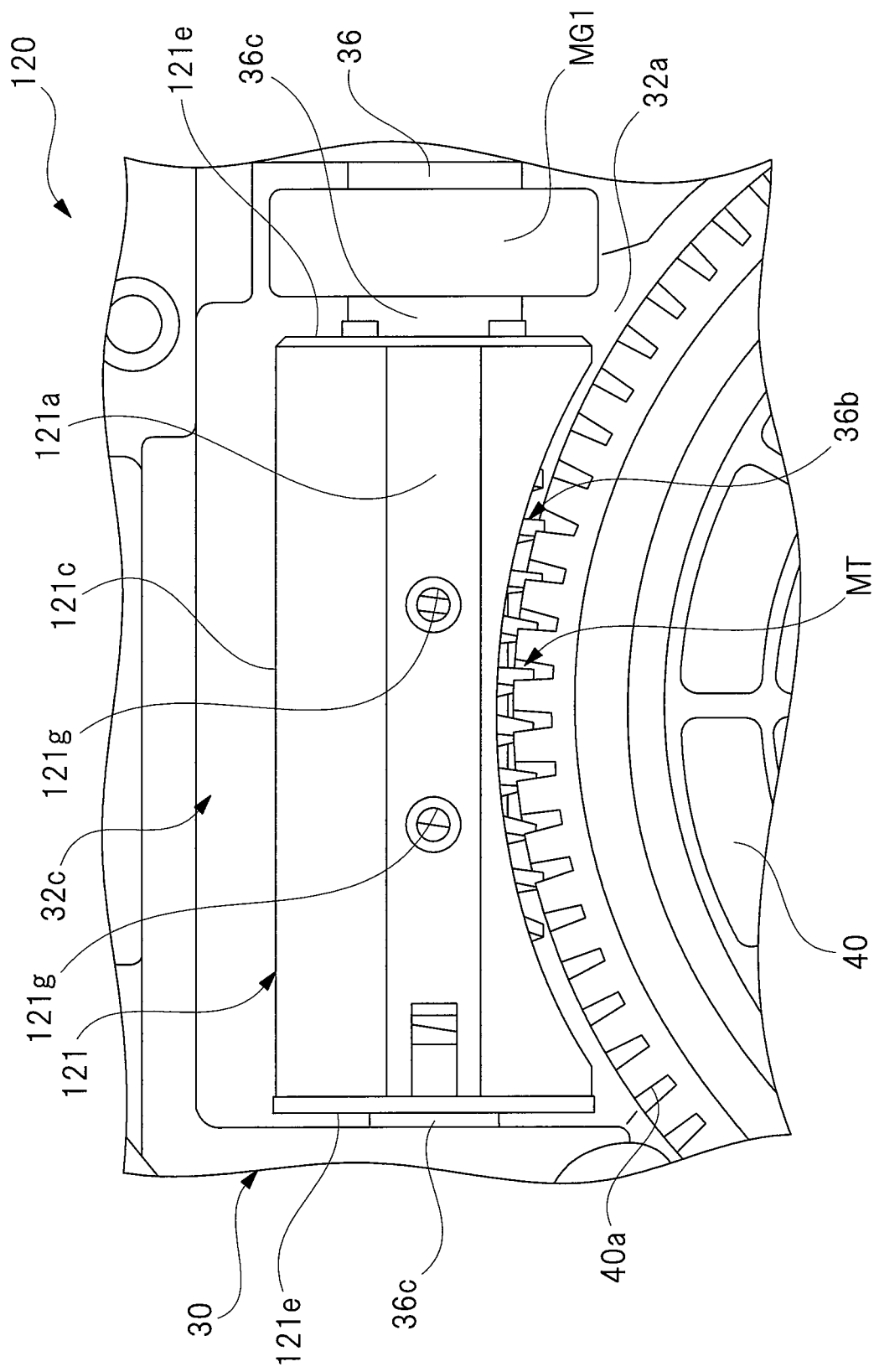
FIG. 20 is a partially enlarged view of a wiper motor according to a fifth embodiment.
Figure 21:
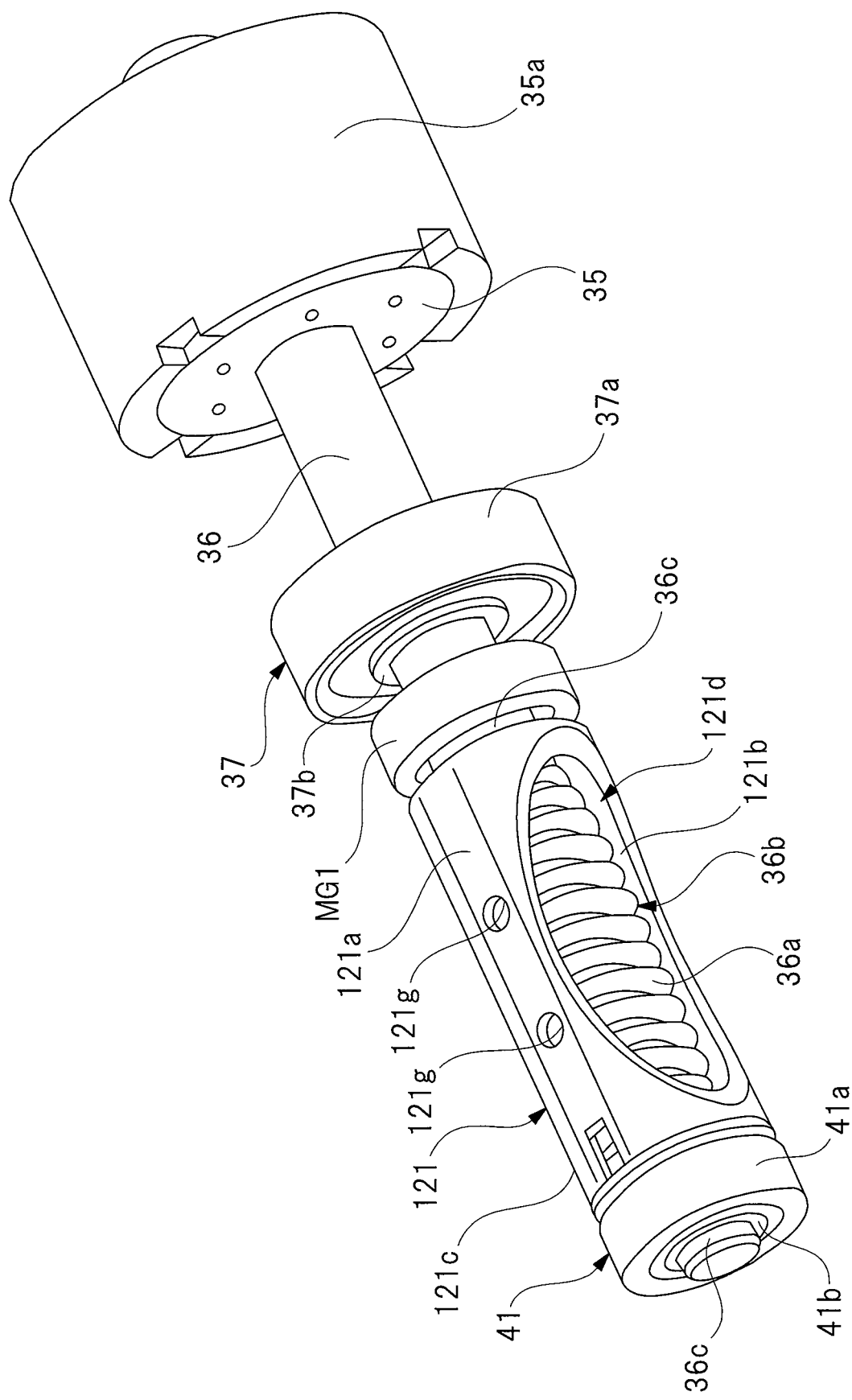
FIG. 21 is a perspective view for explaining the grease holding member of FIG. 20.

FIG. 20 is a partially enlarged view of a wiper motor according to a fifth embodiment; FIG. 21 is a perspective view for explaining the grease holding member of FIG. 20; and FIG. 22 is a perspective view of the grease holding member of FIG. 20 in its isolated form.

As shown in FIG. 20, a wiper motor (motor with speed reduction mechanism) 120 according to the fifth embodiment is different in shape of the grease holding member from the wiper motor 20 (see FIG. 4) according to the first embodiment. Specifically, the anti-scattering cover 80 for grease (grease holding member) of the first embodiment is replaced with a grease holding member 121 having a shape shown in FIG. 22.

As shown in FIGS. 20 and 22, the grease holding member 121 is made of resin material such as plastic, into a cylindrical shape, and structured in such a way as to encircle only the outer periphery of the worm 36b out of the mating part MT. The grease holding member 121 has a top wall 121a and a bottom wall 121b, and with the grease holding member 121 disposed around the outer periphery of the worm 36b, the top wall 121a is disposed closer to the opening 32a of the housing 30 (near side in FIG. 20), and the bottom wall 121b is disposed closer to the bottom 32a of the housing 30 (far side in FIG. 20). Between the top wall 121a and the bottom wall 121b and between the housing 30 and the worm 36b, a connecting wall 121c is formed, which connects the top wall 121a to the bottom wall 121b.

On the opposite side of grease holding member 121 to the connecting wall 121c with respect to the worm 36b, a substantially elliptic and inwardly recessed opening 121d is formed, as shown in FIGS. 21 and 22. Through this opening 121d, the worm 36b placed inside the grease holding member 121 can be peeked, as shown in FIG. 21. The gear teeth 40a of the worm wheel 40 is set counter to the opening 121d. As a result, the gear teeth 40a are in engagement with the worm 36b in an open space provided by the opening 121d. As shown in FIG. 20, a predetermined clearance (tiny gap) is formed between the grease holding member 121 and the gear teeth 40a. This prevents the worm wheel 40 from interfering with the grease holding member 121.

As shown in FIG. 22, circular side walls 121e are formed on both sides of the grease holding member 121 in its axial direction, respectively. These circular side walls 121e have through-holes 121f formed respectively thereon to prevent the circular side walls 121e from coming in contact with the small-diameter shaft portions 36c (see FIG. 20) formed on both ends of the worm 36b in its axial direction. In other words, the through-holes 121f serve as the cutouts of the present invention.

Furthermore, the top wall 121a of the grease holding member 121 has a pair of peeks 121g. Through these peeks 121g, the worm 36b placed inside the grease holding member 121 can be peeked to check the state of application of the grease (not shown) to the mating part MT. The peeks 121g are disposed closer to the opening 32a of the housing 30. During maintenance of the wiper motor 120, therefore, the grease condition can be checked easily and the grease can be resupplied through the peeks 121g.

Here, the top wall 121a serves as the second wall of the present invention, the bottom wall 121b serves as the fourth wall of the present invention, the connecting wall 121c serves as the first wall of the present invention, and the side walls 121e serve as the third wall of the present invention. The grease holding member 121 is set around the worm 36b in such a way that the grease holding member 121 is faced to the worm 36b in its axial direction, and set in place such that the grease holding member 121 covers the outer periphery of the worm 36b.

The fifth embodiment configured in the above manner offers the same operations and effects as those of the fourth embodiment.

The present invention is not limited to the above embodiments but may obviously be modified into various forms of applications on the condition that the modification does not deviate from the substance of the invention. In the above embodiments, the wiper apparatus 12 having the power transmission mechanism 14 is described. The present invention is, however, not limited to this wiper apparatus 12. The wiper apparatus may have no power transmission mechanism 14 provided on a link which transmits the oscillations of the wiper motor 20, 90, 100, 110, or 120 to the pivots 13a and 13b. In such a case, the wiper apparatus is constructed to have a wiper motor corresponding to the pivots 13a and 13b in order to transmit power thereto.

Furthermore, in the first to third embodiments, the wiper motor includes the anti-scattering cover 80 for grease, which is disposed between the speed reduction mechanism SD and the control board 70, which are disposed close to each other, in order to prevent grease "G" from attached to the control board 70. The present invention is not limited to this wiper motor, and may be realized as a motor with speed reduction mechanism (wiper motor) having no control board 70. In such a case, the anti-scattering cover 80 for grease may be fitted directly to the interior of the bottom wall 61 of the gear cover 60, or may be formed as an integral structure including other components combined with the anti-scattering cover 80 for grease. In short, the above wiper motor is capable of preventing exhaustion of grease "G" on the mating part MT where the worm 36b and the worm wheel 40 are in engagement with each other, and preventing scattering of grease "G" to a space surrounding the mating part MT.

Furthermore, the above embodiments provide examples in which the wiper motor 20, 90, 100, 110, or 120 is used as the driving source for the wiper apparatus 12 which wipes the front windshield 11 of the vehicle 10. The present invention is not limited to these examples. The wiper motor 20, 90, 100, 110, or 120 may be used also as a driving source for a rear wiper apparatus of a vehicle or a driving source for a wiper apparatus of a railroad car, ship, construction machine, etc.

Furthermore, the above embodiments provide examples of the wiper motor 20, 90, 100, 110, and 120 adopted as a motor with speed reduction mechanism. The present invention is not limited to these examples. Each of the wiper motors 20, 90, 100, 110, and 120 may be adopted as a motor with speed reduction mechanism, which serves as a driving source for electric slide door, sunroof, power window, etc.

The motor with speed reduction mechanism is used as a driving source for wiper apparatus, electric slide door, sunroof, power window, etc.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A motor with speed reduction mechanism, which has a worm and a worm wheel, comprising:
    a housing in which the worm and the worm wheel are housed and rotatable, the housing having a bottom and an opening, which are opposed to each other in an axial direction of the worm wheel; and
    a grease holding member disposed along the axial direction of the worm wheel and closer to the opening than the worm wheel, the grease holding member holding grease applied to a mating part where the worm and worm wheel are in engagement with each other, wherein
    the grease holding member includes:
    a first wall extending from the opening toward the bottom, the first wall being formed between the worm and a side wall of the housing;
    a second wall extending in a direction intersecting with the first wall, the second wall covering the mating part on the same side as the opening along the axial direction of the worm wheel;
    a pair of third walls extending from the opening toward the bottom at both sides of the worm in an axial direction thereof, the third walls each having a cutout that prevents the third wall from coming in contact with the worm; and
    a first projection is formed between the pair of third walls of the grease holding member, the first projection projecting toward the worm in a direction intersecting with the axial direction of the worm.

2. The motor with speed reduction mechanism according to claim 1, wherein
    a smoothing wall is formed on a side portion of each of the third walls, which is provided on a same side as the worm wheel, and configured to smooth out irregularities of grease on teeth of the worm wheel.

3. The motor with speed reduction mechanism according to claim 2, wherein
    in a view seen in the axial direction of the worm wheel, the smoothing wall is of a shape having a pair of end portions and a bent portion which is sandwiched by the end portions, and the bent portion is disposed closer to the worm wheel than the end portions.

4. The motor with speed reduction mechanism according to claim 1, wherein
    a second projection is formed on an opposite side of the grease holding member to the first wall with respect to the worm, and the second projection projects toward the worm wheel in a direction intersecting with the axial direction of the worm.

5. The motor with speed reduction mechanism according to claim 4, wherein
    a third projection is formed on an opposite side of the housing to the first projection with respect to the worm, and the third projection projects toward the worm in a direction intersecting with an axial direction of the worm.

6. The motor with speed reduction mechanism according to claim 1, wherein
    the worm wheel and the grease holding member are brought and placed in the housing from respective directions the same as each other through the opening.

7. The motor with speed reduction mechanism according to claim 1, wherein
    a grease holding wall is formed on a side of the worm wheel, which is a same side as the bottom along the axial direction of the worm wheel, and the grease holding wall is configured to hold grease likely to move from the mating part toward the bottom.

8. The motor with speed reduction mechanism according to claim 1, wherein
    the grease holding member has a fourth wall extending in a direction intersecting with the first wall, and covering the mating part from a side closer to the bottom along an axial direction of the worm wheel.

9. The motor with speed reduction mechanism according to claim 8, wherein
    the grease holding member includes a first opening/closing element and a second opening/closing element, which open and close to encircle the worm, and
    the first opening/closing element is provided with the second wall, and the second opening/closing element is provided with the fourth wall.

10. A motor with speed reduction mechanism, which has a worm and a worm wheel, comprising:
    a housing in which the worm and the worm wheel are housed and rotatable, the housing having a bottom and an opening, which are opposed to each other in an axial direction of the worm wheel; and
    a grease holding member disposed along the axial direction of the worm wheel and closer to the opening than the worm wheel, the grease holding member holding grease applied to a mating part where the worm and worm wheel are in engagement with each other, wherein
    the grease holding member includes:
    a first wall extending from the opening toward the bottom, the first wall being formed between the worm and a side wall of the housing;
    a second wall extending in a direction intersecting with the first wall, the second wall covering the mating part on the same side as the opening along the axial direction of the worm wheel;
    a pair of third walls extending from the opening toward the bottom at both sides of the worm in an axial direction thereof, the third walls each having a cutout that prevents the third wall from coming in contact with the worm; and
    a smoothing wall is formed on a side portion of each of the third walls, which is provided on a same side as the worm wheel, and configured to smooth out irregularities of grease on teeth of the worm wheel.

11. The motor with speed reduction mechanism according to claim 10, wherein in a view seen in the axial direction of the worm wheel, the smoothing wall is of a shape having a pair of end portions and a bent portion which is sandwiched by the end portions, and the bent portion is disposed closer to the worm wheel than the end portions.

12. A motor with speed reduction mechanism, which has a worm and a worm wheel, comprising:
   a housing in which the worm and the worm wheel are housed and rotatable, the housing having a bottom and an opening, which are opposed to each other in an axial direction of the worm wheel; and
   a grease holding member disposed along the axial direction of the worm wheel and closer to the opening than the worm wheel, the grease holding member holding grease applied to a mating part where the worm and worm wheel are in engagement with each other, wherein
   the grease holding member includes:
   a first wall extending from the opening toward the bottom, the first wall being formed between the worm and a side wall of the housing;
   a second wall extending in a direction intersecting with the first wall, the second wall covering the mating part on the same side as the opening along the axial direction of the worm wheel;
   a pair of third walls extending from the opening toward the bottom at both sides of the worm in an axial direction thereof, the third walls each having a cutout that prevents the third wall from coming in contact with the worm; and
   a fourth wall extending in a direction intersecting with the first wall, and covering the mating part from a side closer to the bottom along an axial direction of the worm wheel; and
   a first opening/closing element and a second opening/closing element, which open and close to encircle the worm;
   wherein the first opening/closing element is provided with the second wall, and the second opening/closing element is provided with the fourth wall.

* * * * *